US012455536B2

(12) United States Patent
Devillard et al.

(10) Patent No.: US 12,455,536 B2
(45) Date of Patent: *Oct. 28, 2025

(54) SPRING FOR A NOTCHING SYSTEM AND TIMEPIECE NOTCHING SYSTEM

(71) Applicant: ROLEX SA, Geneva (CH)

(72) Inventors: Arthur Devillard, Champlecy (FR); James Rejzner, Saint-Julien-en-Genevoix (FR)

(73) Assignee: ROLEX SA, Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/558,569

(22) Filed: Dec. 21, 2021

(65) Prior Publication Data

US 2022/0197221 A1 Jun. 23, 2022

(30) Foreign Application Priority Data

Dec. 22, 2020 (EP) .................................... 20216575

(51) Int. Cl.
*G04B 19/28* (2006.01)

(52) U.S. Cl.
CPC .................................. *G04B 19/286* (2013.01)

(58) Field of Classification Search
CPC ............................ G04B 19/283; G04B 19/286
See application file for complete search history.

(56) References Cited

U.S. PATENT DOCUMENTS 5,541,895 A 7/1996 Nussbaum
6,871,997 B2 3/2005 Hartmann et al.
9,164,482 B2 10/2015 Villaret
9,188,959 B2 11/2015 Bertrand et al.
9,348,315 B2 5/2016 Cattaneo et al.
(Continued)

FOREIGN PATENT DOCUMENTS

CH 454375 A 4/1968
CH 704893 A2 11/2012
(Continued)

OTHER PUBLICATIONS

European Search Report and Written Opinion dated Jun. 15, 2021 in priority application No. EP20216575.9 with English machine translation (total 17 pages).

(Continued)

*Primary Examiner* — Renee S Luebke
*Assistant Examiner* — Matthew Daniel Hwang
(74) *Attorney, Agent, or Firm* — Seckel IP, PLLC

(57) ABSTRACT

A notching system (100) including a spring (1) having a first toothset including n first teeth (11*a*, 12*a*) a first member (2) having a second toothset including m second teeth (22*a*, 22*b*), and a second member (3) mounted so as to be movable, in particular mounted so as to be rotatable, with respect to the first member (2), the first and second toothsets being arranged such that, through their interactions, they define p notches or indexed positions, the spring (1) including at least two elastic arms (11, 12), and at least one first pivot connection element (1*b*) between said two elastic arms (11, 12), the second member including at least one second pivot connection element (3*b*) cooperating with the at least one first pivot connection element (1*b*) in order to create at least one pivot connection between the spring (1) and the second member (3).

25 Claims, 20 Drawing Sheets

(56) References Cited

U.S. PATENT DOCUMENTS

| | | | |
|---|---|---|---|
| 11,609,538 B2 | 3/2023 | Di Piazza et al. | |
| 2004/0141424 A1 | 7/2004 | Hartmann et al. | |
| 2005/0128875 A1 | 6/2005 | Bron | |
| 2008/0008053 A1 | 1/2008 | Zimmermann | |
| 2013/0201804 A1 | 8/2013 | Bertrand et al. | |
| 2014/0056112 A1 | 2/2014 | Villaret | |
| 2015/0227113 A1 | 8/2015 | Cattaneo et al. | |
| 2019/0294114 A1* | 9/2019 | Silvant | G04B 19/286 |
| 2019/0384224 A1 | 12/2019 | Di Piazza et al. | |
| 2020/0050153 A1 | 2/2020 | Silvant | |

FOREIGN PATENT DOCUMENTS

| | | | |
|---|---|---|---|
| EP | 0322511 | A1 | 7/1989 |
| EP | 0686897 | A1 | 12/1995 |
| EP | 1431845 | A1 | 6/2004 |
| EP | 1544691 | A1 | 6/2005 |
| EP | 1586960 | A1 | 10/2005 |
| EP | 2624076 | A1 | 8/2013 |
| EP | 2813902 | A1 | 12/2014 |
| EP | 3379342 | A1 | 9/2018 |
| EP | 3499319 | A2 | 6/2019 |
| EP | 3543800 | A1 | 9/2019 |
| EP | 3582028 | A1 | 12/2019 |
| EP | 3608730 | A1 | 2/2020 |
| GB | 1158128 | A | 7/1969 |
| JP | 2004-205515 | A | 7/2004 |
| JP | 2015-155900 | A | 8/2015 |
| JP | 2020-020780 | A | 2/2020 |

OTHER PUBLICATIONS

European Search Report and Written Opinion dated Jun. 21, 2021 in priority application No. EP20216567.6 of co- pending U.S. Appl. No. 17/558,563; with English machine translation (total 17 pages) (D1-D3, D5, and D7 cited in the priority ESR of the co-pending application are not listed in this IDS form since they are already listed in the other submitted IDS form).

European Patent Office Transmittal of Third Party Observation dated Apr. 25, 2025 in priority application No. EP20216575.9; with English machine translation (total 15 pages).

Japanese Office Action dated Jun. 3, 2025 in counterpart application No. JP 2021205785; with English machine translation (total 17 pages).

Japanese Office Action dated Jun. 3, 2025 in application No. JP 2021205779, counterpart of co-pending U.S. Appl. No. 17/558,563, now U.S. Pat. No. 11,977,355; with English machine translation (total 17 pages).

* cited by examiner

SPRING FOR A NOTCHING SYSTEM AND TIMEPIECE NOTCHING SYSTEM

INTRODUCTION

This application claims priority of European patent application No. EP20216575.9 filed Dec. 22, 2020, the content of which is hereby incorporated by reference herein in its entirety.

The invention relates to a spring for a notching system. The invention also relates to a notching system comprising such a spring. The invention also relates to a timepiece case or a timepiece movement comprising such a spring or such a notching system. The invention also relates to a timepiece comprising such a case or such a movement or such a notching system or such a spring.

BACKGROUND ART

The literature in the field of timepieces mentions numerous notching devices, in particular angularly indexed or notched rotary bezels.

By way of example, the document EP2624076 discloses a unidirectional rotary bezel, the angular indexing of which is implemented via a single first notching element in the form of a jumper returned by a return spring against a contrate toothset in a direction parallel to the axis of rotation of said bezel. That spring is in that case in the form of a helical spring.

The document EP0686897, for its part, discloses a bidirectional rotary bezel, the angular indexing of which is implemented by a wire spring in the form of a single elastic arm. The latter is articulated at a first end to the annular seat of a case middle, while its free end forms a single first notching element provided to cooperate with an interior toothset formed on the bezel. The angular indexing of the bezel is thus brought about by a single first notching element formed on the spring. The wire spring described in the document EP0686897 has the particular feature of being designed so as to bring about substantially equal rotational torques irrespective of the direction of rotation of the bezel. To that end, said wire spring has in particular a concave or substantially concave shape when seen from the axis of rotation of the bezel.

The device described in the document EP1431845 further proposes improving such a bidirectional notched rotary bezel by ensuring that the forces are balanced with respect to the axis of rotation of said bezel, this contributing to the pleasant sensation felt when manipulating it. To that end, that device employs a spring in the form of a closed loop centered on the axis of rotation of the bezel. The spring comprises elastic arms that are each provided with a first notching element provided to cooperate with second notching means of a notching ring. That spring comprises first connecting means shaped and disposed on each of the first notching means such that the latter can move radially relative to the axis of rotation of the bezel and thus cooperate with the second notching means.

The document EP3543800 likewise discloses a spring in the form of a closed loop that participates in a notching system for a uni- or bidirectional rotary bezel. That spring has the particular feature of comprising elastic arms, each connected together at their longitudinal ends by first connecting means that are in the form of indentations. Furthermore, each elastic arm comprises a first notching element disposed equidistantly from two indentations, which is designed so as to cooperate with second notching means of a notching ring. The first and second notching means are specifically in the form of teeth here. In the scope of a preferred variant of that device, the spring is fitted to the bezel at its indentations, the latter cooperating with lugs disposed on said bezel. Thus, the arms of the spring are made to deform elastically with regard to these fitting connections. More particularly, these arms are made to deform elastically in a simultaneous and synchronized manner. To that end, the teeth of each of the elastic arms cooperate in a coordinated manner with the teeth of the notching ring. More particularly, in a first indexing configuration of the bezel, the teeth of the elastic arms are all situated between two teeth of the notching ring. In a second bezel configuration, the teeth of the elastic arms are all situated on the tops of the teeth of the notching ring. Nevertheless, the elastic deformation of a given elastic arm is independent of the deformation of the elastic arms that adjoin it, this being defined only by the design, in particular the section, of said arm. Furthermore, that spring has, at rest, an annular shape. In particular, each elastic arm is, at rest, in the form of a portion of a circle centered on the axis of rotation of the bezel. Thus, each arm has a concave shape as seen from the axis of rotation of the bezel. When the bezel passes from the first configuration to the second, each of the elastic arms is made to bend, causing a reduction in the radius of curvature of each of the arms.

The document EP3608730 discloses a rotary bezel comprising a notching system employing a spring such as the one described in the document EP3543800. That notching system is designed such that the arms of the spring do not deform simultaneously. To that end, the spring and the notching ring are arranged and designed such that only one tooth of a given elastic arm is situated at the root of the toothset of the notching ring. There, too, the elastic deformation of a given elastic arm is independent of the deformation of the elastic arms that adjoin it. Such an embodiment makes it possible to maximize the number of notches of the bezel. Nevertheless, that involves minimizing the size of the teeth of the notching ring, and this can entail a risk of premature wearing of the notching system.

Also known is the document EP1544691, which discloses a notching mobile comprising a closed-loop spring, formed of two symmetric arms, and a notching ring, which are each centered on said mobile. Two first notching means of the spring cooperate with second notching means formed on the notching ring. To that end, first connection means of the spring (on a wheel of the mobile) are arranged at the two first notching means, such that the latter can move in translation with regard to the second notching means, and so the arms of the spring can deform elastically.

The document EP3379342 presents a notching system, the structure of which is equivalent to that of the device in the document EP1544691, with a spring that has the specific feature of being made from an amorphous metal alloy. The first connection means of the spring (on a wheel of the mobile) are likewise arranged at the two first notching means of the spring.

The document CH454375 discloses a notching mobile, the closed-loop spring of which comprises a first notching element in the form of a tooth provided to cooperate with a notching ring. That spring has the particular feature of being fixed to a wheel of the mobile at a bore formed in said spring, that bore being disposed at a different location than the tooth of said spring. More particularly, the bore and the tooth of the spring are disposed on either side of the axis of the mobile. That spring has, at rest, an annular shape. It therefore has a concave shape as seen from the axis of rotation of the mobile, and which is centered on the axis of rotation of the mobile. When the tooth of the spring passes over a tooth of the notching ring, the spring is made to bend, causing the spring to pass from an annular shape to a substantially elliptical shape. The radius of curvature of the spring at or in the region of the tooth is therefore reduced.

SUMMARY OF THE INVENTION

The aim of the invention is to provide a notching spring and a notching system that make it possible to improve the notching springs and notching systems known from the prior art. In particular, the invention proposes a particularly compact spring and a particularly reliable notching system, which make it possible to obtain a varied and large number of notches.

According to a first aspect of the invention, subjects are defined by the following propositions.

1. A spring (1; 1'; 1*) for a notching system (100; 100'; 100*), the spring comprising:
   at least two elastic arms (11, 12; 11', 12'; 11*, 12*), and
   a first toothset comprising first notching teeth (11*a*, 12*a*; 11*a'*, 12*a'*; 11*a, 12*a) disposed on each of the arms,
   the spring being designed such that, in a position in which one of the arms of the spring is not loaded, said arm is convex as seen from the top of the first notching tooth of said arm.
2. The spring (1; 1'; 1*) as proposed in the preceding proposition, wherein the spring comprises at least one first pivot connection element (1*b*; 1*b'*; 1*b) between said two elastic arms (11, 12; 11', 12'; 11*, 12***).
3. The spring (1; 1'; 1*) as proposed in either of the preceding propositions, wherein the spring is in the form of a closed loop.
4. The spring (1; 1'; 1*) as proposed in one of the preceding propositions, wherein each elastic arm, when it is not loaded, is in the form of a circular arc, the center of which is situated preferably on a first circle (C10; C10'; C10*) coaxial with the spring and having a non-zero radius, in particular having a radius greater than 0.2 times the radius of the spring, or greater than 0.3 times the radius of the spring, or greater than 0.4 times the radius of the spring.
5. The spring (1; 1') as proposed in the preceding proposition, wherein the first circle (C10; C10') has a radius greater than 1.5 times the radius of the spring, or greater than 1.8 times the radius of the spring, or greater than 2 times the radius of the spring.
6. The spring (1; 1'; 1*) as proposed in one of the preceding propositions, wherein the at least two elastic arms (11, 12; 11', 12'; 11*, 12*) form a clamp intended to act on a first member (2; 2'; 2*) having a second toothset comprising second notching teeth (22*a*, 22*b*; 22*a'*, 22*b'*; 22*a, 22*b).
7. The spring (1; 1'; 1*) as proposed in one of the preceding propositions, wherein the spring is designed such that the radius of curvature of any one of the arms of the spring increases, or is reversed, when said arm is loaded by the action of second notching teeth (22*a*, 22*b*; 22*a'*, 22*b'*; 22*a, 22*b) of a first member (2; 2'; 2*).
8. The spring (1') as proposed in one of the preceding propositions, wherein each of the first notching teeth (11*a'*, 12*a'*) comprises a first stop element (111*a'*, 121*a'*).
9. The spring (1; 1'; 1*) as proposed in one of the preceding propositions, wherein each of the first notching teeth (11, 12; 11', 12'; 11*, 12*) is disposed at the midway point of each elastic arm, and/or wherein each elastic arm (11', 12') comprises a first abutment force reacting element (11*b'*, 12*b'*), the first abutment force reacting element being disposed for example at the midway point of each elastic arm.

10. The spring (1; 1'; 1*) as proposed in one of the preceding propositions, wherein the spring comprises n elastic arms and/or n first pivot connection elements, where n≥2, and/or wherein the spring exhibits n-fold symmetry of revolution.
11. The spring (1; 1'; 1*) as proposed in one of the preceding propositions, wherein the spring has substantially a polygonal shape, in particular a regular polygon shape, and/or wherein segments linking the axes of first pivot connection elements (1*b*; 1*b'*; 1*b**) constitute a polygonal shape, in particular a regular polygon shape.
12. A notching system (100; 100'; 100*) comprising a spring (1; 1'; 1*) as proposed in one of the preceding propositions and a first member (2; 2'; 2*) having a second toothset, the spring and the first member being arranged so as to act on one another.
13. The notching system (100; 100'; 100*) as proposed in the preceding proposition, which comprises a second member (3; 3'; 3*) mounted so as to be movable, in particular mounted so as to be rotatable, with respect to the first member (2; 2'; 2*) or vice versa, the second member comprising at least one second pivot connection element (3*a*, 3*b*; 3*a'*, 3*b'*; 3*a, 3*b) cooperating with at least one first pivot connection element (1*a*, 1*b*; 1*a'*, 1*b'*; 1*a, 1*b) in order to create at least one pivot connection between the spring (1; 1'; 1*) and the second member (3; 3'; 3*).
14. The notching system (100; 100'; 100*) as proposed in either of propositions 12 and 13, wherein the first toothset comprises n first teeth (11*a*, 12*a*; 11*a'*, 12*a'*; 11*a, 12*a), and wherein the first member (2; 2'; 2*) comprises a second toothset comprising m second teeth (22*a*, 22*b*; 22*a'*, 22*b'*; 22*a, 22*b), where, for example:
    n=8 and m=6, or
    n=6 and m=5, or
    n=10 and m=12, or
    n=12 and m=15, or
    n=12 and m=20, or
    n=8 and m=15.
15. A timepiece device (110; 110'; 110*), in particular:
    a rotary bezel (110; 110'; 110*), or
    a rotary flange, or
    an orientable back, or
    an orientable crown, or
    a display device, typically a display device for a time zone or a display device for a programmable display,
    the device comprising a spring as proposed in one of propositions 1 to 11 and/or a notching system as proposed in one of propositions 12 to 14.
16. A timepiece case (10; 10'; 10*) comprising a spring as proposed in one of propositions 1 to 11 and/or a notching system as proposed in one of propositions 12 to 14 and/or a timepiece device as proposed in proposition 15.
17. A timepiece (200; 200'; 200*) comprising a spring as proposed in one of propositions 1 to 11 and/or a notching system as proposed in one of propositions 12 to 14 and/or a timepiece device as proposed in proposition 15 and/or a case as proposed in proposition 16.

According to a second aspect of the invention, subjects are defined by the following propositions.

18. A notching system 100; 100'; 100* comprising:
a spring 1; 1'; 1* including a first toothset comprising n first teeth 11*a*, 12*a*; 11*a*', 12*a*'; 11*a, 12*a, and
a first member 2; 2'; 2* including a second toothset comprising m second teeth 22*a*, 22*b*; 22*a*', 22*b*'; 22*a, 22*b,
a second member 3; 3'; 3* mounted so as to be movable, in particular mounted so as to be rotatable, with respect to the first member 2; 2'; 2*,
the first and second toothsets being arranged such that, through their interactions, they define p notches or indexed positions,
the spring 1; 1'; 1* comprising:
at least two elastic arms 11, 12; 11', 12'; 11*, 12*, and
at least one first pivot connection element 1*b*; 1*b*'; 1*b between said two elastic arms 11, 12; 11', 12'; 11*, 12***,
the second member comprising at least one second pivot connection element 3*b*; 3*b*'; 3*b cooperating with the at least one first pivot connection element 1***b*; 1*b*'; 1*b in order to create at least one pivot connection between the spring 1; 1'; 1* and the second member 3; 3'; 3***.
19. The notching system 100; 100'; 100* as proposed in proposition 18, wherein p=m×n/k, where k is a natural integer, for example k=1 or k=2 or k=3 or k=4, in particular:
p=24 and n=8 and m=6, or
p=30 and n=6 and m=5, or
p=60 and n=10 and m=12, or
p=60 and n=12 and m=15, or
p=60 and n=12 and m=20, or
p=120 and n=8 and m=15.
20. The notching system 100; 100'; 100* as proposed in either of propositions 18 and 19, wherein the first teeth of the spring are situated between two pivot connections, in particular at the midway point of each of the elastic arms.
21. The notching system 100; 100'; 100* as proposed in one of propositions 18 to 20, wherein the spring is designed such that, when one of the arms of the spring is not loaded, said arm is convex as seen from the top of the first tooth of said arm.
22. The notching system 100; 100'; 100* as proposed in one of propositions 18 to 21, wherein the spring is in the form of a closed loop, and/or wherein the system comprises n elastic arms and/or n pivot connections, where n≥2.
23. The notching system 100; 100'; 100* as proposed in one of propositions 18 to 22, wherein the spring has substantially a polygonal shape, in particular a regular polygon shape, and/or wherein segments linking the axes of the first pivot connection elements 1*b*; 1*b*'; 1*b** constitute a polygonal shape, in particular a regular polygon shape.
24. The notching system 100; 100'; 100* as proposed in one of propositions 18 to 23, wherein the elastic arms, when they are not loaded, are in the form of circular arcs, the centers of which are situated preferably on one and the same first circle C10; C10'; C10* coaxial with the spring and having a non-zero radius, in particular having a radius greater than 0.2 times the radius of the spring, or greater than 0.3 times the radius of the spring, or greater than 0.4 times the radius of the spring.
25. The notching system 100; 100' as proposed in proposition 24, wherein the first circle (C10; C10') has a radius greater than 1.5 times the radius of the spring, or greater than 1.8 times the radius of the spring, or greater than 2 times the radius of the spring.
26. The notching system 100' as proposed in one of propositions 18 to 25, wherein each of the first teeth 11*a*', 12*a*' comprises a first stop element 111*a*', 121*a*'.
27. The notching system 100' as proposed in one of propositions 18 to 26, wherein each of the elastic arms 11', 12' comprises a first abutment force reacting element 11*b*', 12*b*', the first abutment force reacting element being disposed for example at the midway point of each elastic arm.
28. The notching system 100; 100'; 100* as proposed in one of propositions 18 to 27, wherein the first member is a ring, and/or wherein the second teeth 22*a*, 22*b*; 22*a*', 22*b*'; 22*a, 22*b are each separated by a recess or a portion 21*a*, 21*b*; 21*a*', 21*b*'; 21*a, 21*b.
29. The notching system 100; 100'; 100* as proposed in one of propositions 18 to 28, wherein the first and second toothsets are arranged such that, at a given time, in particular at any time, a first tooth exerts a first mechanical action on a second tooth in a first area of contact and a first tooth different than the previous one exerts a second mechanical action on a second tooth different than the previous one in a second area of contact, the first and second mechanical actions having different intensities and/or different directions.
30. The notching system 100; 100'; 100* as proposed in proposition 29, wherein, at a given time, in particular at any time, another first tooth exerts a third mechanical action on a portion or a recess of the second member.
31. The notching system 100; 100'; 100* as proposed in either of propositions 29 and 30, wherein the first and second toothsets are arranged such that an indexed position of the first member relative to the second member is defined by the first mechanical action and by the second mechanical action, the first and second mechanical actions bringing about opposing torques for driving the first member relative to the second member.
32. A timepiece device 110; 110'; 110*, in particular:
a rotary bezel 110; 110'; 110*, or
a rotary flange, or
an orientable back, or
an orientable crown, or
a display device, typically a display device for a time zone or a display device for a programmable display,
the device comprising a notching system as proposed in one of propositions 18 to 31.
33. A timepiece case 10; 10'; 10* comprising a notching system as proposed in one of propositions 18 to 31 and/or a timepiece device as proposed in proposition 32.
34. A timepiece 200; 200'; 200* comprising a notching system as proposed in one of propositions 18 to 31 and/or a device as proposed in proposition 32 and/or a case as proposed in proposition 33.

According to a third aspect of the invention, subjects are defined by the following propositions.

35. A spring 1; 1'; 1* for a notching system 100; 100', comprising:
at least two elastic arms 11, 12; 11', 12'; 11*, 12*,
a first toothset comprising first notching teeth 11*a*, 12*a*; 11*a*', 12*a*'; 11*a, 12*a disposed respectively on the arms 11, 12; 11', 12'; 11*, 12*, and
at least one first pivot connection element 1*b*; 1*b*'; 1*b situated between said two elastic arms 11, 12; 11', 12'; 11*, 12***.

36. The spring 1; 1'; 1* as proposed in proposition 35, wherein the at least two elastic arms 11, 12; 11', 12'; 11*, 12* form a clamp intended to act on a first member 2; 2'; 2* having a second toothset comprising second notching teeth 22*a*, 22*b*; 22*a'*, 22*b'*, 22*a, 22*b.
37. The spring 1; 1'; 1* as proposed in either of propositions 35 and 36, wherein the spring is designed such that, in a position in which one of the arms of the spring is not loaded, said arm is convex as seen from the top of the first notching tooth of said arm.
38. The spring 1; 1'; 1* as proposed in one of propositions 35 to 37, wherein the spring is designed such that the radius of curvature of any one of the arms of the spring increases, or is reversed, when said arm is loaded by the action of second notching teeth 22*a*, 22*b*; 22*a'*, 22*b'*; 22*a, 22*b of a first member 2; 2'; 2*.
39. The spring 1' as proposed in one of propositions 35 to 38, wherein each of the first teeth 11*a'*, 12*a'* comprises a first stop element 111*a'*, 121*a'*.
40. The spring 1' as proposed in one of propositions 35 to 39, wherein each of the elastic arms 11', 12' comprises a first abutment force reacting element 11*b'*, 12*b'*, the first abutment force reacting element being disposed for example at the midway point of each of the elastic arms.
41. The spring 1; 1'; 1* as proposed in one of propositions 35 to 40, wherein the spring comprises n elastic arms, where n≥2, and/or exhibits n-fold symmetry of revolution.
42. The spring 1; 1'; 1* as proposed in one of propositions 35 to 41, wherein the spring exhibits a geometry in the form of a closed loop.
43. The spring 1; 1'; 1* as proposed in one of propositions 35 to 42, wherein the spring has substantially a polygonal shape, in particular a regular polygon shape, and/or wherein segments linking the axes of first pivot connection elements 1*b*; 1*b'*; 1*b** constitute a polygonal shape, in particular a regular polygon shape.
44. A notching system 100; 100'; 100* comprising a spring 1; 1'; 1* as proposed in one of propositions 35 to 43 and a first member 2; 2'; 2* having a second toothset, the spring and the first member being arranged so as to act on one another.
45. The notching system 100; 100'; 100* as proposed in proposition 44, which comprises a second member 3; 3'; 3* mounted so as to be movable, in particular mounted so as to be rotatable, with respect to the first member 2; 2'; 2*, the second member comprising at least one second pivot connection element 3*a*, 3*b*; 3*a'*, 3*b'*; 3*a, 3*b cooperating with the at least one first pivot connection element in order to create at least one pivot connection between the spring 1; 1'; 1* and the second member 3; 3'; 3*.
46. The notching system 100; 100'; 100* as proposed in either of propositions 44 and 45, wherein the first toothset comprises n first teeth 11, 12; 11', 12'; 11*, 12*, and wherein the first member 2; 2'; 2* comprises a second toothset comprising m second teeth 22*a*, 22*b*; 22*a'*, 22*b'*; 22*a, 22*b, where, for example:
    - n=8 and m=6, or
    - n=6 and m=5, or
    - n=10 and m=12, or
    - n=12 and m=15, or
    - n=12 and m=20, or
    - n=8 and m=15.
47. A timepiece device 110; 110'; 110*, in particular:
    - a rotary bezel, or
    - a rotary flange, or
    - an orientable back, or
    - an orientable crown, or
    - a display device, typically a display device for a time zone or a display device for a programmable display, the device comprising a spring as proposed in one of propositions 35 to 43 and/or a notching system as proposed in one of propositions 44 to 46.
48. A timepiece case 10; 10'; 10* comprising a spring as proposed in one of propositions 35 to 43 and/or a notching system as proposed in one of propositions 44 to 46 and/or a timepiece device as proposed in proposition 47.
49. A timepiece 200; 200'; 200* comprising a spring as proposed in one of propositions 35 to 43 and/or a notching system as proposed in one of propositions 44 to 46 and/or a timepiece device as proposed in proposition 47 and/or a case as proposed in proposition 48.

According to a fourth aspect of the invention, subjects are defined by the following propositions.

50. A spring 1"; 1'" for a notching system 100"; 100'", the spring comprising:
    - at least two elastic arms 11", 12"; 11'", 12'", and
    - a first toothset comprising first notching teeth 11*a"*, 12*a"*; 11*a'"*, 12*a'"* disposed on each of the arms,
      - the arms having a shape comprising two concave parts 118", 119"; 118'", 119'" as seen from the tops of the first notching teeth.
51. The spring as proposed in proposition 50, wherein the two concave parts join and form an area:
    - where the concave parts have tangents forming an angle β", β'", for example an angle β", β'" comprised between 60° and 120° or an angle equal to 90° or equal to about 90°, and
    - constituting the first tooth.
52. The spring as proposed in proposition 50 or 51, wherein the concave parts:
    - have a curvature radius comprised between 0.05 time or 0.1 time the radius of the circle C1", C1'" and 0.3 time the radius of the circle C1", C1'", and/or
    - the concave parts are tangent or substantially tangent to the circle C1", C1'" at the ends of the arms.

Unless technically or logically incompatible, a subject may comprise any combination of features in the first, second, third and fourth aspects.

BRIEF DESCRIPTION OF THE DRAWINGS

The appended drawings depict, by way of examples, three embodiments of a timepiece.

DETAILED DESCRIPTION OF PARTICULAR EMBODIMENTS

Figure 1:
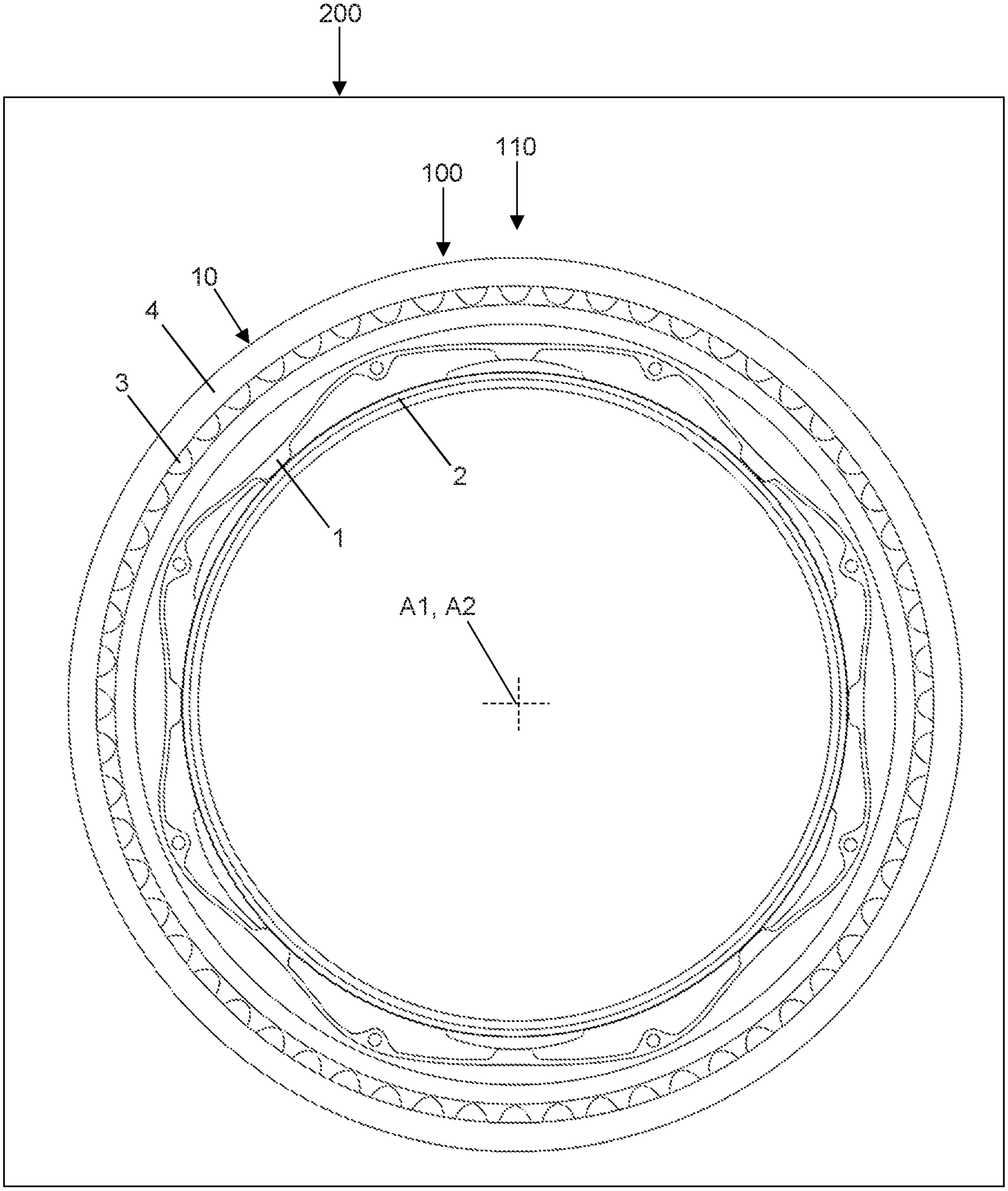
FIG. 1 is a schematic view of a first embodiment of a timepiece.

A first embodiment of a timepiece 200 is described below with reference to FIGS. 1 to 9.

The timepiece 200 is for example a watch, in particular a wristwatch.

The timepiece 200 comprises a timepiece movement intended to be mounted in a timepiece casing or case 10 in order to protect it from the external environment.

The timepiece movement may be an electronic movement or a mechanical movement, in particular an automatic movement.

The timepiece 200, in particular the timepiece case 10 comprises a timepiece device 110. The timepiece device may be an exterior device such as a rotary bezel or a rotary flange or an orientable back or an orientable crown. Alternatively, the timepiece device may be a device of the movement, in particular a device for adjusting a device for displaying time information, typically a display device for a time zone or a display device for a programmable display, which makes it possible to move a display member through an angular pitch predefined by way of such a notching system.

The timepiece 200, in particular the timepiece case 10 or the timepiece device 110, comprises a notching system 100.

The notching system 100 comprises:

a first member 2, a second member 3, and a spring 1.

Preferably, in this embodiment, the first member 2 is a case middle of the timepiece case or an element secured to a case middle of the timepiece case. More particularly, the first member 2 may be a ring 2 attached to a case middle 4 of the timepiece case. The ring 2 may be fixed to an annular seat of the case middle 4.

For example, the first member may have an annular shape. For example, the second member may have an annular shape.

Preferably, in this embodiment, the second member 3 is a rotary bezel, which is able to turn relative to the case middle 4 and therefore relative to the first member 2.

Preferably, in this embodiment, the spring 1 is mechanically connected to the second member 3.

The spring 1 comprises an axis A1. This axis A1 is an axis of symmetry of the spring 1 or of the second member 3, or an axis of rotation of the spring 1 or of the second member 3 relative to the first member 2. Thus, the second member 3 is mounted in a pivot connection relative to the first member 2 about the axis A1.

The first member 2 comprises an axis A2. This axis A2 is an axis of symmetry of the first member 2.

The axes A1 and A2 are coincident or substantially coincident.

The notching system makes it possible to define notches or indexed positions in the movement of the second member relative to the first member.

To this end, the spring 1 comprises first notching elements, in particular first notching teeth 11*a*, 12*a*, 13*a*, 14*a*, 15*a*, 16*a*, 17*a*, 18*a* and the first member 2 comprises second notching elements, in particular second notching teeth 22*a*, 22*b*, 22*c*, 22*d*, 22*e*, 22*f*.

The spring 1 and the first member 2 are arranged so as to act on one another in order to define the different notches or indexed positions or indexing positions. In particular, the first toothset is arranged so as to act on the second toothset in order to define the different notches or indexed positions or indexing positions of the notching system.

Preferably, the first toothset comprises n teeth, the second toothset comprises m teeth and the first and second toothsets are arranged such that, through their interactions, they define p notches or indexed positions or indexing positions, where $p=m\times n/k$ and k is a natural integer, for example k=1 or k=2 or k=3 or k=4.

For example:

p=24 and n=8 and m=6, or p=30 and n=6 and m=5, or p=60 and n=10 and m=12, or p=60 and n=12 and m=15, or p=60 and n=12 and m=20, or p=120 and n=8 and m=15.

Thus, when the second member 3 is moved in rotation through a complete turn relative to the first member 2, p notches or indexed positions or indexing positions are felt.

The spring 1 comprises:

at least two elastic arms 11, 12, 13, 14, 15, 16, 17, 18, and a first notching toothset comprising first notching elements, in particular first notching teeth 11*a*, 12*a*, 13*a*, 14*a*, 15*a*, 16*a*, 17*a*, 18*a* disposed on each of the arms 11, 12, 13, 14, 15, 16, 17, 18.

Preferably, when one of the arms 11, 12, 13, 14, 15, 16, 17, 18 is not loaded, it has a convex shape when it is seen from the top of its notching element or the top of its first notching tooth 11*a*, 12*a*, 13*a*, 14*a*, 15*a*, 16*a*, 17*a*, 18*a*.

In particular, one of these arms has a convex shape, as seen from the top of the notching element or the top of the first notching tooth of said arm, when said arm is not loaded.

In particular, said arm is convex as seen from the axis A1 or the axis A2, if the spring is disposed around or on the outside of the first member 2.

Preferably, the spring comprises n arms, where $n\geq 2$. In the particular variant of the first embodiment that is described with reference to FIGS. 1 to 9, n=8. Thus, the spring 1 comprises 8 arms 11, 12, 13, 14, 15, 16, 17, 18, each comprising first notching elements, in particular first notching teeth 11*a*, 12*a*, 13*a*, 14*a*, 15*a*, 16*a*, 17*a*, 18*a*.

These first notching teeth extend at an angle $\alpha$12 about the axis A1. These first notching teeth are furthermore spaced apart by an angle $\alpha$11 about the axis A1. These first notching teeth are preferably disposed periodically with an angle $\alpha$11+$\alpha$12 about the axis.

Preferably, the at least two elastic arms of the spring form a clamp intended to act on the first member 2. In other words, the at least two elastic arms, on account of their design and their arrangement, preferably exert a force counter to the first member 2. This is made possible in particular by the first and second connection elements, which make it possible in particular to adequately pretension the spring 1 against the first member 2.

Advantageously, the notching system 100 is bidirectional. It thus makes it possible to employ a second "notched" member 3 that is mounted in a pivotable manner on the first member 2, specifically in both directions of rotation.

Preferably, the spring is in the form of a closed loop. Preferably, the spring is in the form of a closed loop centered on the axis A1. In other words, the different arms are advantageously connected mechanically to one another by their ends. More precisely, each given arm of the spring is connected at each of its ends to one end of a neighboring or adjacent arm of the given arm.

Preferably, the spring 1 comprises at least one first pivot connection element 1*b* between the at least two elastic arms 11, 12. The first pivot connection elements 1*b* are preferably each situated or positioned between two adjacent or consecutive or neighboring elastic arms.

Advantageously, the spring 1 comprises as many first pivot connection elements 1*a*, 1*b*, 1*c*, 1*d*, 1*e*, 1*f*, 1*g*, 1*h* as arms 11, 12, 13, 14, 15, 16, 17, 18, a first pivot connection element being disposed at each end of each of the arms. In other words, one and the same first pivot connection element is disposed at the two ends of two neighboring or adjacent arms.

Preferably, the first pivot connection elements are disposed on one and the same circle C1 centered on the axis A1. By convention, the radius of this circle C1 will be referred to as the outside radius of the spring or the radius of the spring. Preferably, the first pivot connection elements are bores with axes parallel to the axes A1 and A2. Preferably, the axes of these bores are disposed on the circle C1.

The segments connecting the axes of the first pivot connection elements of the spring form a polygon, in particular a regular polygon. Thus, the spring has substantially a polygonal shape, in particular a regular polygon shape. This is all the more apparent when the spring is not loaded or pretensioned, in other words when it is removed from the notching system (the elastic arms then all having one and the same radius of curvature).

In the variant of this first embodiment that is illustrated in FIGS. 1 to 9, the segments connecting the axes of the first pivot connection elements of the spring form an octagon O. Thus, the spring has a substantially octagonal shape. In particular, when the spring is not loaded or pretensioned, the spring has substantially a star shape on account of the convex shape of each of the arms of the spring.

Generally, the spring preferably exhibits n-fold symmetry of revolution.

The second member 3 comprises at least one second pivot connection element 3*b* intended to cooperate with the at least one first pivot connection element 1*b* in order to create the at least one pivot connection between the spring 1 and the second member 3 about an axis parallel to the axis A1 or A2. Advantageously, the second member 3 comprises as many second pivot connection elements 3*a*, 3*b*, 3*c*, 3*d*, 3*e*, 3*f*, 3*g*, 3*h* as the spring 1 comprises first pivot connection elements 1*a*, 1*b*, 1*c*, 1*d*, 1*e*, 1*f*, 1*g*, 1*h*. Preferably, the second pivot connection elements are pins or pegs or protrusions parallel to the axes A1 and A2.

The first and second pivot connection elements thus form articulations of the spring 1 to the second member 3. Consequently, each elastic arm constitutes a beam that is held on and articulated to the second member at each of its ends.

The first and second connection elements make it possible in particular to adequately pretension the spring 1 against the first member 2 while constituting pivot connections of the spring 1 relative to the second member 3.

Figure 3:
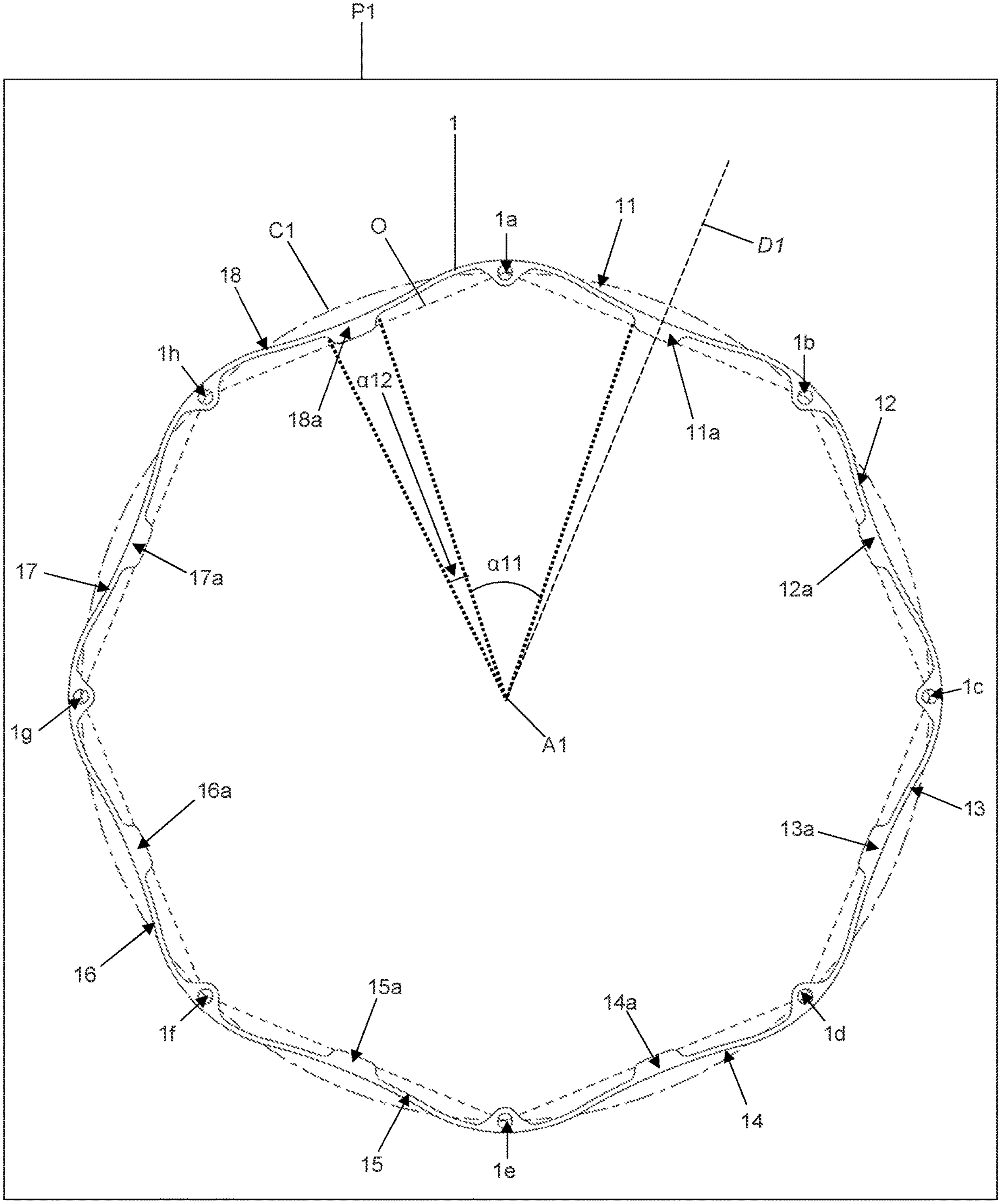
FIG. 3 is a detail view of the spring according to the first embodiment.
Figure 4:
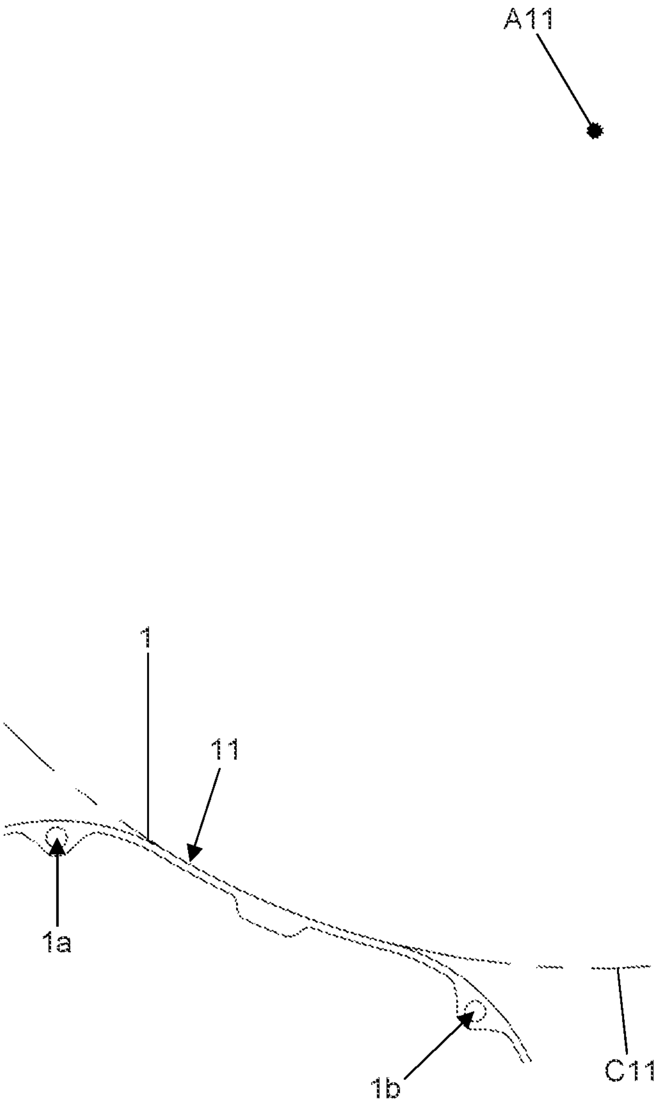
FIGS. 4 and 5 are views defining the geometry of the spring according to the first embodiment.
Figure 5:
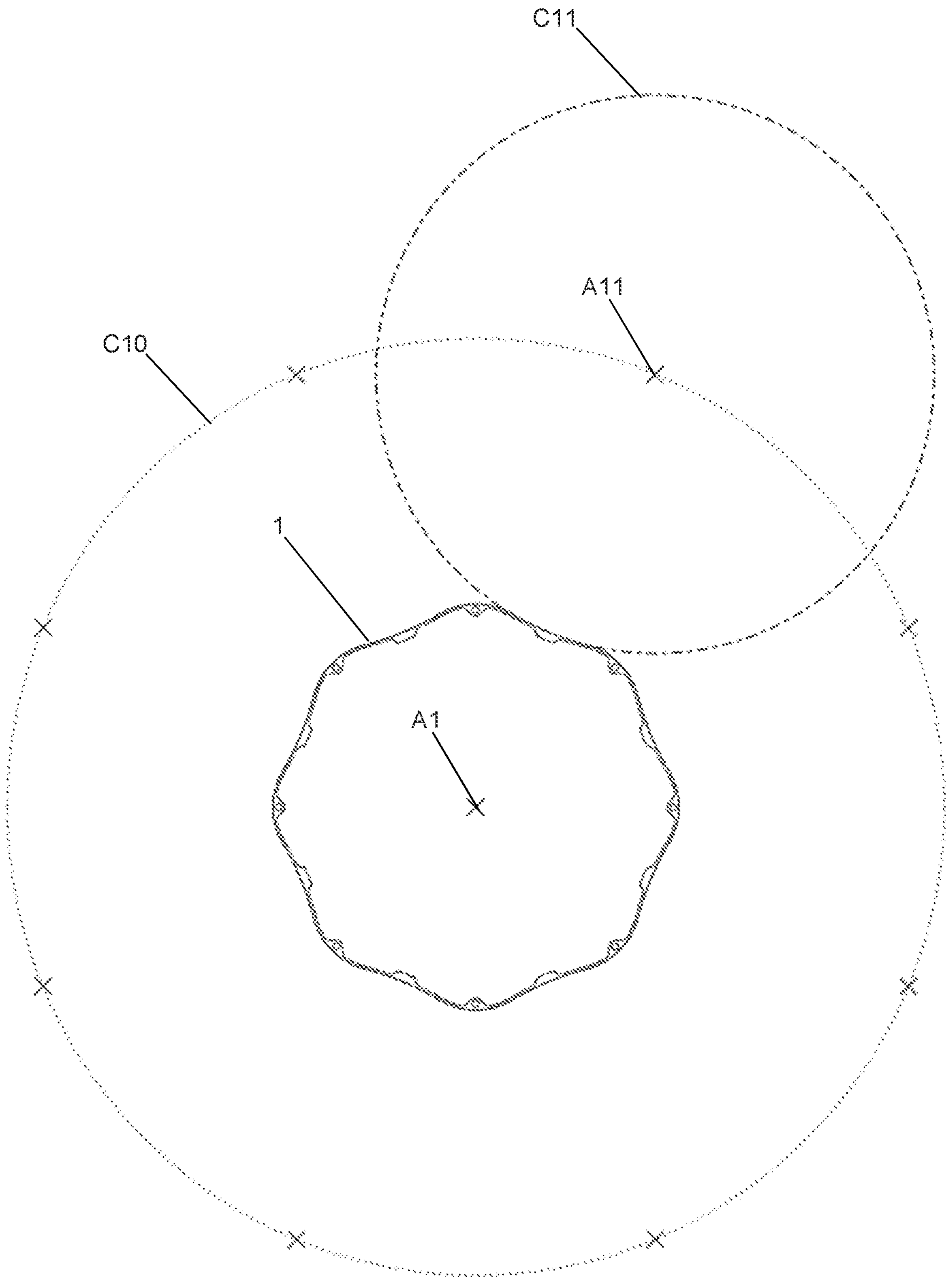

Preferably, as shown in FIGS. 4 and 5, the elastic arms, when they are not loaded, are in the form of circular arcs C11, the centers A11 of which are situated preferably on one and the same first circle C10 centered on the axis A1 (i.e. coaxial with the spring) and having a non-zero radius, in particular having a radius greater than 1.5 times the radius of the circle C1 defined above (i.e. the radius of the spring), or greater than 1.8 times the radius of the circle C1 (i.e. the radius of the spring), or greater than 2 times the radius of the circle C1 (i.e. the radius of the spring). In the variant of the first embodiment illustrated in FIGS. 1 to 9, the first circle C10 has a radius equal to 2.3 times the radius of the circle C1 or 2.3 times the radius of the spring.

By way of example, FIG. 4 illustrates an arm 11 of the spring 1, the central part of which conforms to a portion of a circle C11, the center A11 of which is situated outside the spring 1, in particular outside the circle C1.

Figure 2:
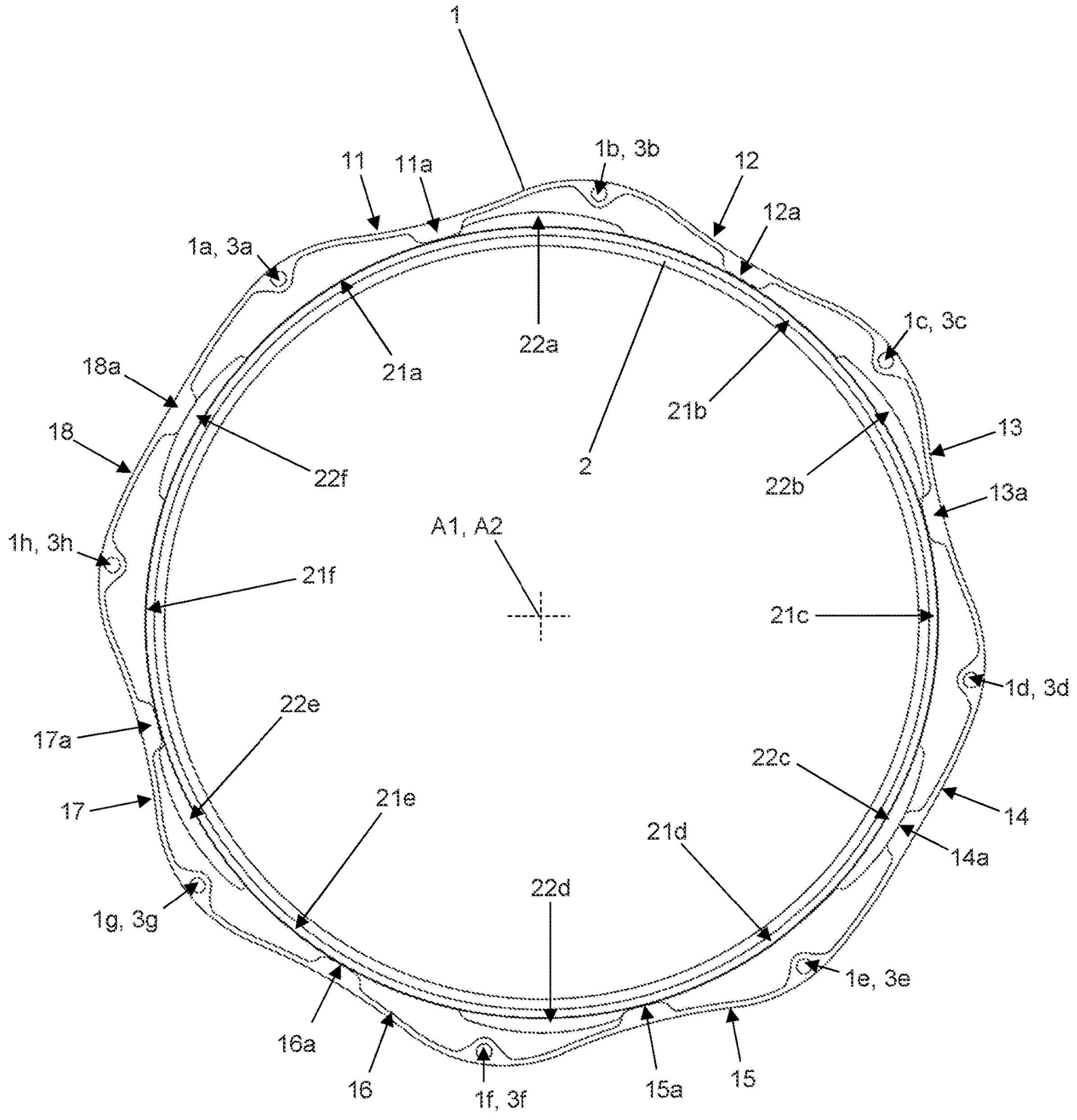
FIG. 2 is a view of a spring and of a first member according to the first embodiment.

Advantageously, the notching system, in particular the spring, is designed such that the radius of curvature of any one of the arms of the spring increases, or is reversed, when this arm is loaded by the action of the first member 2, in particular by the action of a second notching element. Such a deformation of the arms 14 and 18 is shown in FIG. 2. Also advantageously, in this configuration, the radius of curvature of each of the arms 13, 15 and 11, 17 which adjoin the arms 14 and 18, respectively, is smaller than that of the arms 14 and 18.

As seen above, the spring 1 comprises first notching elements 11*a*, 12*a*, which can take the form of first notching teeth or of protrusions, forming the first notching toothset. These teeth or protrusions can be oriented toward the inside of the spring or toward the axis A1 of the spring. These teeth or protrusions have for example sections with shapes that are substantially trapezoidal in a plane perpendicular to the axes A1 and A2.

Alternatively, these protrusions may be constituted by abrupt and localized changes in the direction of the arms, without the sections of the arms otherwise changing significantly in these zones.

The second member 2 comprises second notching elements 22*a*, 22*b*, such as second notching teeth or protrusions, forming the second notching toothset. These second teeth or protrusions have for example sections with shapes that are substantially trapezoidal in a plane perpendicular to the axes A1 and A2, and comprise in particular a domed external profile.

Advantageously, each of the first notching elements 11*a*, 12*a* is disposed at the midway point of each of the elastic arms of the spring, that is to say substantially equidistantly from the pivoting elements. More particularly, the first notching element 11*a* is disposed equidistantly from the first pivoting elements 1*a* and 1*b*. More particularly, the first notching element 12*a* is disposed equidistantly from the first pivoting elements 1*b* and 1*c*. Thus, there are n first notching elements on the spring, since there are n arms forming the spring.

The first member 2 comprises m second notching elements. Preferably, n/m. For example, in the example of the first embodiment illustrated in FIGS. 1 to 9, m=6, n=8. Thus, the first member 2 comprises 6 second notching elements 22*a*, 22*b*, 22*c*, 22*d*, 22*e*, 22*f*.

In this example, the notching system generates 24 notches or indexed positions for a complete turn of the second member 3 relative to the first member 2.

On the first member 2, the second notching elements each extend angularly at an angle α22 about the axis A2. Preferably, the second notching elements are distributed regularly about the axis A2. Two adjacent or consecutive or neighboring second notching elements are separated by a recess or a first portion 21*a*, 21*b*, 21*c*, 21*d*, 21*e*, 21*f*. Each portion 21 extends angularly at an angle α21 about the axis A2.

Preferably, the portions 21*a* to 21*f* are portions of a cylinder of axis A2 having a radius r1.

The second notching elements may be in the form of lobes 22*a* to 22*f* protruding from the portions 21*a* to 21*f*. The second notching elements may thus extend from the first radius r1 to a second radius r2 so as to form obstacles to the first notching elements of the spring 1. The ratio r2/r1 is involved in particular in the notching sensation. In this particular example, this ratio is for example around 1.04.

The values all, α12 and α21, α22 make it possible in particular to define the notching frequency of the notching system. In particular, they make it possible to define the number of notches of the notching system. The number of notches p, for identical angles α12 and α22 on the spring 1 and on the first member 2, respectively, may in particular be defined by the following relationship:

(α12+α22)/2=360/p, where α12 and α22 are measured in degrees.

Preferably, the angular extent α21 may be strictly greater than the angular extent α22, or greater than or equal to 1.5×α22.

In this embodiment, the first notching elements exhibit axial symmetry with respect to a straight line D1 passing through the axis A1 of the spring in a plane P1 passing through the spring (i.e. perpendicular to the axis A1), as shown in FIG. 3.

Figure 6:
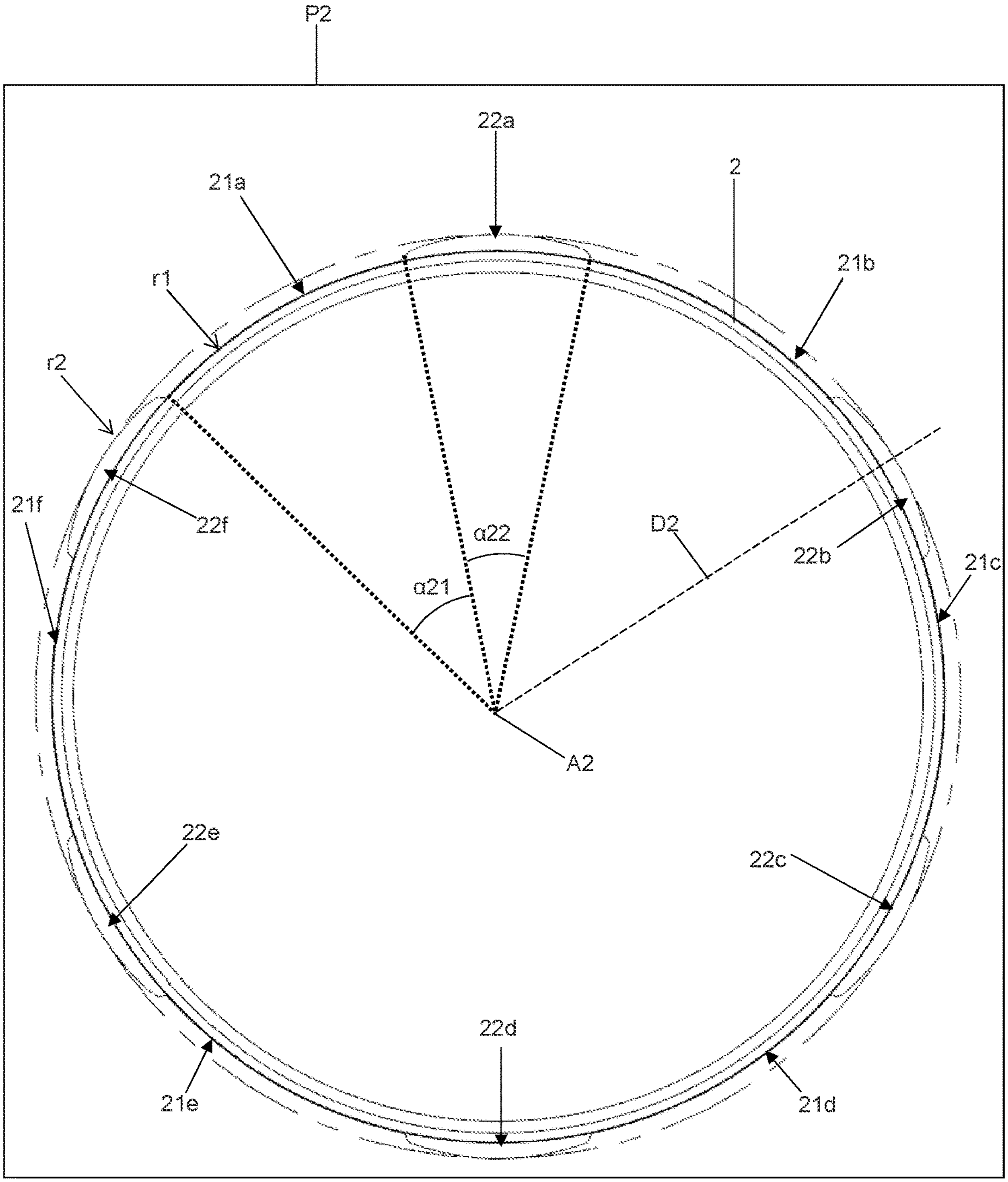
FIG. 6 is a view defining the first member according to the first embodiment.

In this embodiment, the second notching elements exhibit axial symmetry with respect to a straight line D2 passing through the axis A2 in a plane P2 passing through the first member (i.e. perpendicular to the axis A2), as shown in FIG. 6.

Preferably, the first member exhibits m-fold symmetry of revolution.

Advantageously, the notching system, in particular the first and second notching elements are arranged such that, at a given time, in particular at any time, a given first notching element exerts a first mechanical action on a given second notching element in a first area of contact and a first notching element other than the given first notching element exerts a second mechanical action on a second notching element other than the given second notching element in a second area of contact, the first and second mechanical actions having different intensities and/or different directions.

Also preferably, at the given time or at any time, a first notching element, different than the two first notching elements, exerts a third mechanical action on a portion 21*a* to 21*f* of the first member 2.

The notching system, in particular the first and second notching elements are arranged such that an indexed position of the second member relative to the first member is defined by the first mechanical action and by the second mechanical action, the first and second mechanical actions bringing about opposing torques for driving the second member 3 relative to the first member 2.

During the relative movement of the first and second members 2 and 3, the at least two elastic arms of the spring 1 have the particular feature of moving about their articulation or their common pivot connection and of deforming elastically relative to their common articulation or their pivot connection under actuation of the first member 2, in particular under the effect of the second notching elements. Thus, in at least one actuation phase of the second member 3 relative to the first member 2, the arms 11 and 12 oscillate and deform relative to the articulation or to the pivot connection formed by the first and second connection elements 1*b* and 3*b*.

These oscillations and elastic deformations of the arms 11, 12, 13, 14, 15, 16, 17, 18 result from the cooperation of the first notching elements 11*a*, 12*a*, 13*a*, 14*a*, 15*a*, 16*a*, 17*a*, 18*a* with the second notching elements 22*a*, 22*b*, 22*c*, 22*d*, 22*e*, 22*f* of the first member 2.

When an arm of the spring 1 is deformed elastically by way of the cooperation between a first notching element and a second notching element, this brings about an increase in the radius of curvature of said arm, the latter being able to exhibit a rectilinear or substantially rectilinear design, or a concave design (the radius of curvature decreasing again after passing through an infinite value), when the first notching element is positioned at the top of a second notching element, i.e. at a radius r2 of the first member 2. The more the arm is deformed, the greater the intensity of the mechanical action produced by the arm on the first member 2 via the first notching element of said arm.

Preferably, when an arm of the spring 1 is deformed elastically by way of the cooperation between a first notching element that it bears and a second notching element of the first member, the first notching element does not move out of the circle C1 passing through the first connection means of the spring 1. This advantageously makes it possible to propose a particularly compact notching system.

Figure 7:
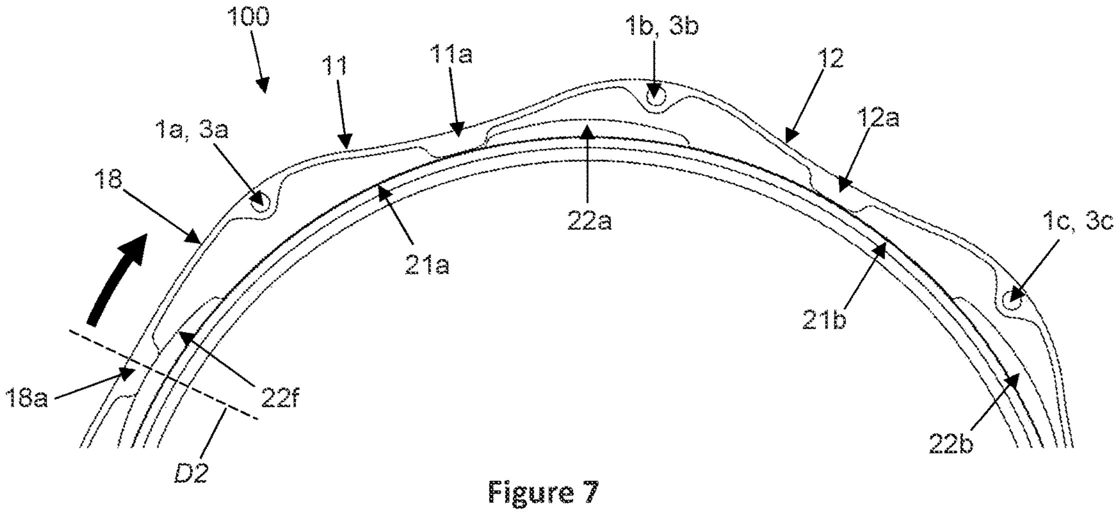
FIGS. 7 to 9 are partial views illustrating an operating sequence of the timepiece according to the first embodiment.
Figure 8:
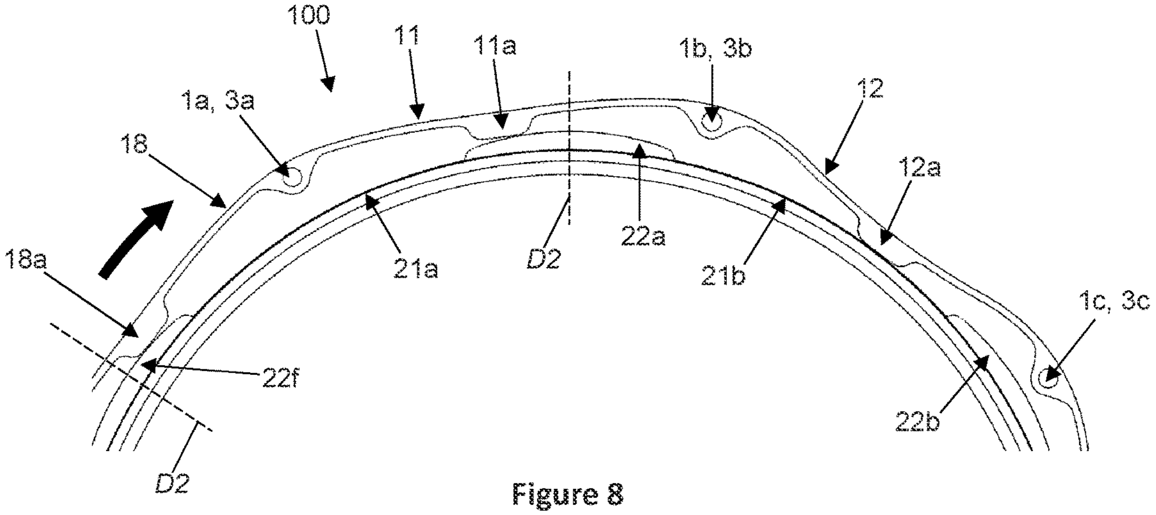
Figure 9:
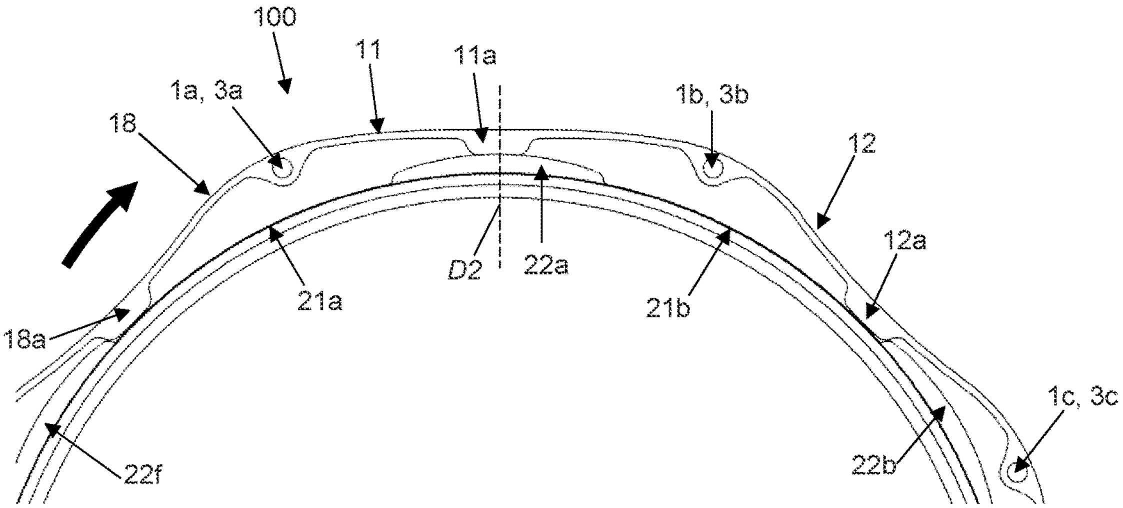
Figure 10:
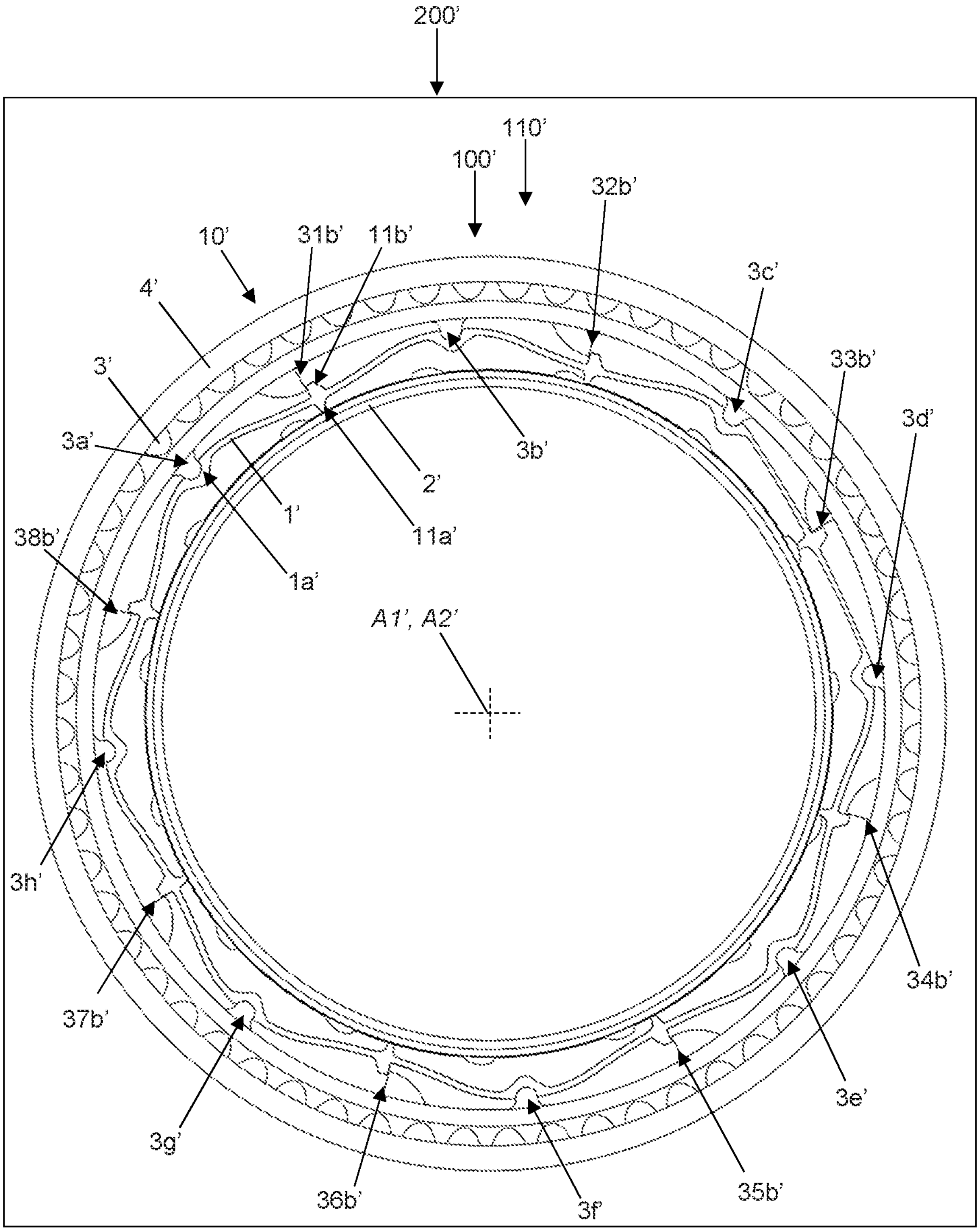
FIG. 10 is a schematic view of a second embodiment of a timepiece.
Figure 11:
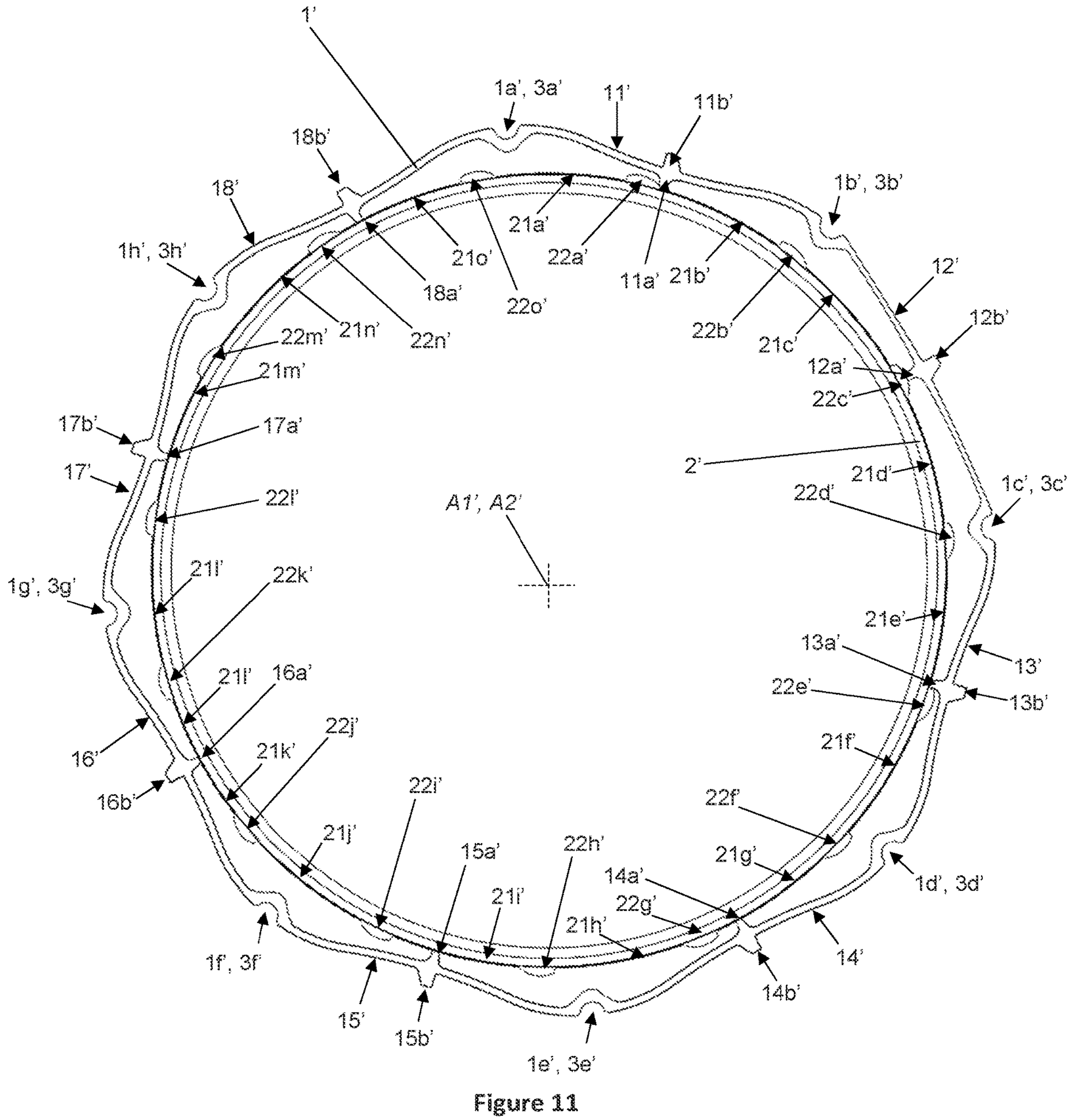
FIG. 11 is a view of a spring and of a first member according to the second embodiment.
Figure 12:
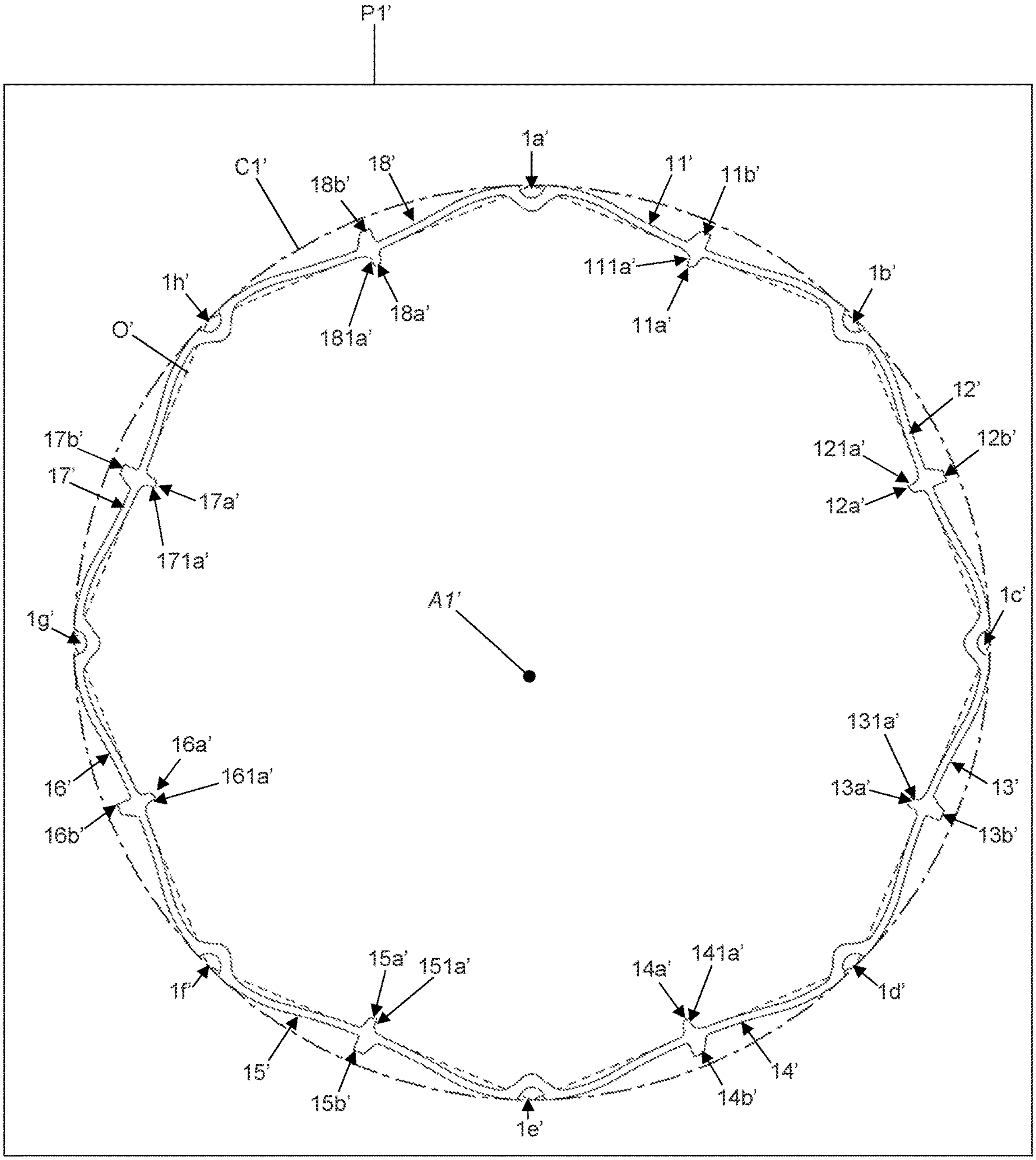
FIG. 12 is a detail view of the spring according to the second embodiment.
Figure 13:
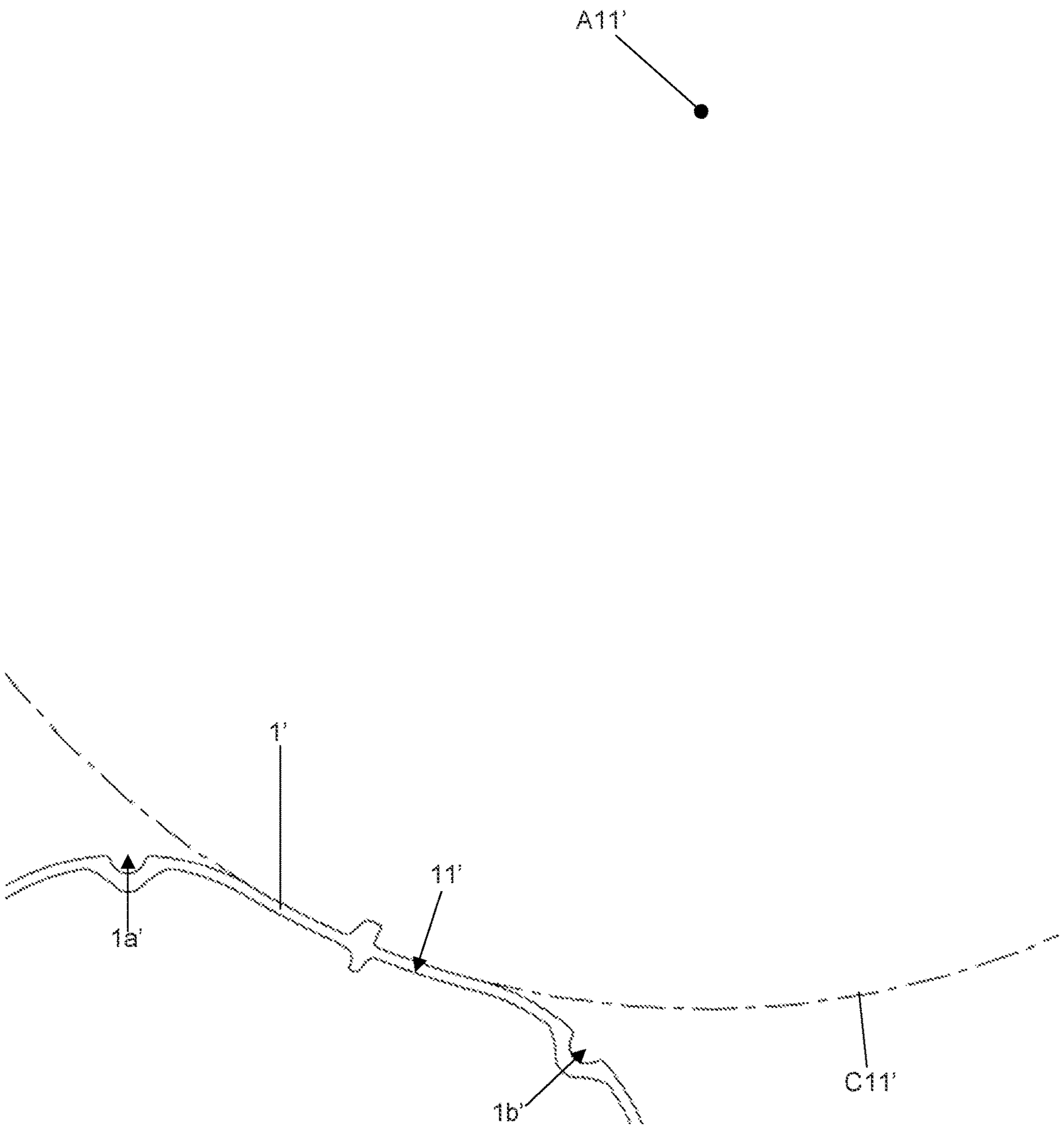
FIGS. 13 and 14 are views defining the geometry of the spring according to the second embodiment.
Figure 14:
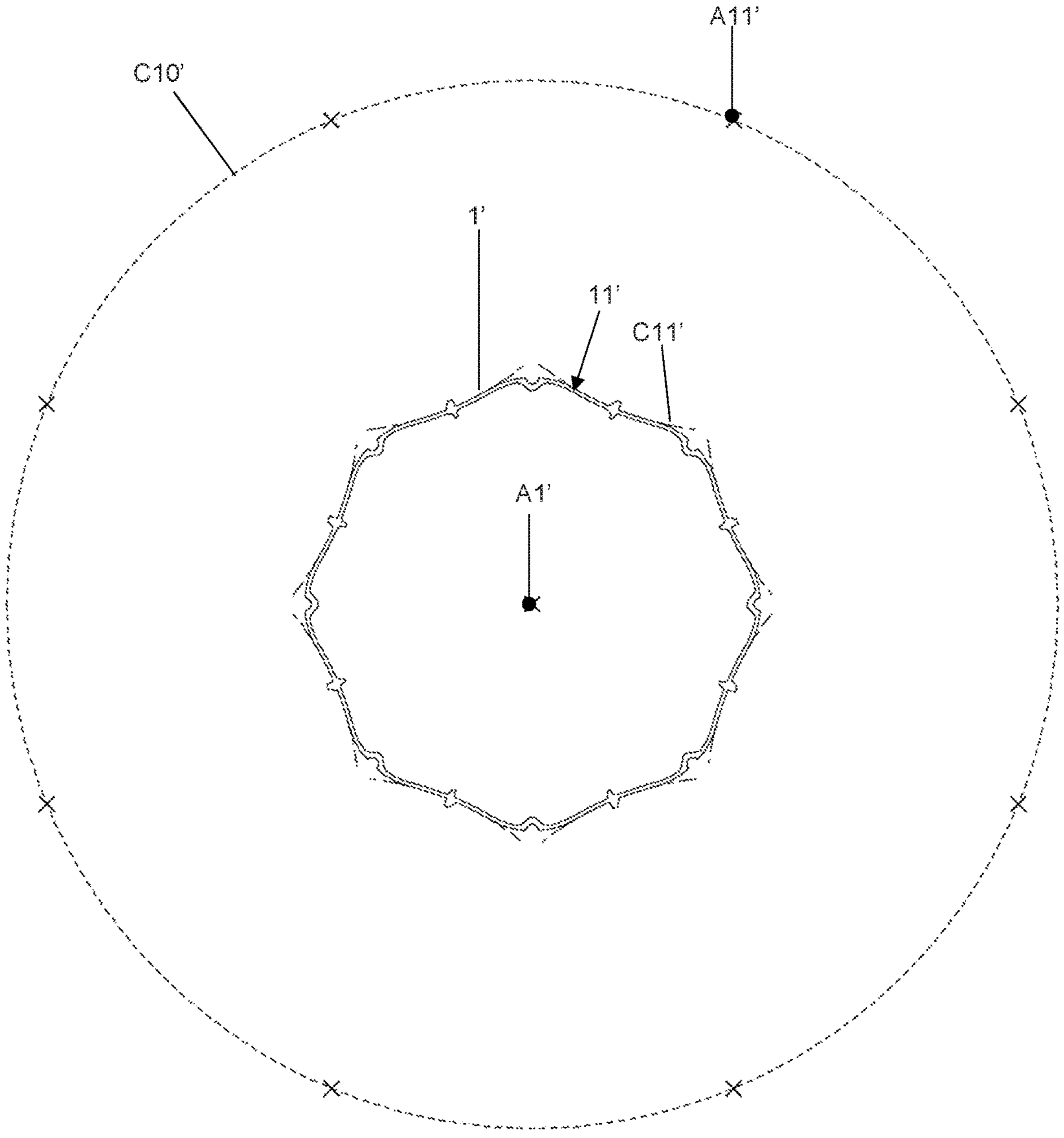

FIGS. 7 to 9 illustrate different configurations of the spring 1 with regard to the first member 2, in order to show the way in which a notching of the system 100 is generated. For the sake of simplification, the second member 3, to which the spring 1 is articulated, is not shown in these figures.

FIG. 7 illustrates a part of the system in a first configuration, in which a first notching element 11*a* of the spring 1 is in angular abutment against a second notching element 22*a* of the first member 2 in a first direction of rotation of the second member 3, indicated by the bold arrow, while this same first notching element 11*a* bears radially against a first portion 21*a* of the first member 2. This is a first stable angular configuration of the second member 3 (not shown) with respect to the first member 2. This first configuration is achieved following pivoting of the second member 3 in the first direction of rotation, and according to a threshold rotational torque of the second member 3. In this first configuration, the arm 11 has a convex shape as seen from the axis A1 of the spring 1 or the axis A2 of the first member 2. The first notching element 18*a* of the arm 18, connected to the arm 11 at an articulation 1*a*, 3*a*, for its part bears radially against the top of the second notching element 22*f*, i.e. against the second notching element 22*f* at the radius r2 in a median zone of the second notching element 22*f* passing through a straight line D2. In this first configuration, the arm 18 has a rectilinear or substantially rectilinear shape. Furthermore, the first notching element 12*a* of the arm 12, connected to the arm 11 at an articulation 1*b*, 3*b*, for its part bears radially against a first portion 21*b*. In this first configuration, the arm 12 has a convex shape as seen from the axis A1 of the spring 1 or the axis A2 of the first member 2.

The crossing of the second notching element 22*a* by the first notching element 11*a*, i.e. the passage from the radius r1 to the radius r2 of the first member 2, requires an increase in the rotational torque of the second member 3 relative to the first member 2 so as to achieve a rotational torque of the second member 3 that is higher than the threshold torque for driving the second member 3. To this end, the respective articulations 1*a*, 3*a* and 1*b*, 3*b* allow the arm 11 to deform optimally while minimizing the stresses in it. This increase in the torque brought about at least partially by the cooperation of the elements 11*a* and 22*a* characterizes the start of the notching. This increase can be more or less abrupt or linear depending on the geometry of the first notching elements and the second notching elements.

FIG. 8 illustrates a part of the system in a second configuration, in which the first notching element 11*a* bears radially against the second notching element 22*a*, upstream of the top of the second notching element 22*a*, after having partially crossed said second notching element following rotation of the second member in the first direction of rotation. In this second configuration, the arm 11 has a rectilinear or substantially rectilinear shape. In this second configuration, the first notching element 12*a* of the arm 12 remains bearing radially against the first portion 21*b*, and the arm 12 therefore maintains a convex shape as seen from the axis A1 of the spring 1 or the axis A2 of the first member 2. In this second configuration, the first notching element 18*a* of the arm 18 remains bearing radially against the second notching element 22*f*, and the arm 18 therefore maintains a rectilinear or substantially rectilinear shape. Nevertheless, in this second configuration, the first notching element 18*a* has crossed the top of the second notching element 22*f* and the arm 18 is thus ready to restore the elastic potential energy it has accumulated by virtue of its elastic deformation.

By virtue of the arrangement of the first notching element 18*a* with respect to the second notching element 22*f*, the second member 3 can thus be driven in rotation in the first direction of rotation under the effect of a torque that is below the threshold torque. This decrease in the torque brought about at least partially by the cooperation of the elements 18*a* and 22*f* characterizes the end of the notching. This decrease can be more or less abrupt or linear depending on the geometry of the first notching elements and the second notching elements.

FIG. 9 illustrates a part of the system after the end of the notching. In this third configuration, the first notching element 18*a* bears radially against the portion 21*a* of the first member, after having crossed the second notching element 22*f*, while the first notching element 11*a* is situated at the top of the second notching element 22*a*. For its part, the first notching element 12*a* is in angular abutment against a second notching element 22*b* of the first member 2, while this same first notching element 12*a* bears radially against a first portion 21*b* of the first member 2.

This third configuration is equivalent to the first configuration in that crossing of the second notching element 22*b* by the first notching element 12*a* at least partially initiates the start of a second notch, following the above-described first notch. The end of this second notch would then be characterized at least partially by the passage of the first notching element 11*a* from the second notching element 22*a* to the portion 21*b*.

This description shows that a given notch is not exclusively defined by a given first notching element cooperating with a given second notching element or by first notching means cooperating simultaneously and in a synchronized manner with different second notching means. In the notching system according to the invention, a notch may be defined by the conjunction:

- of a first cooperation between a given first notching element and a given second notching element, and
- of a second cooperation between another given first notching element and another given second notching element, and possibly
- of a third cooperation between at least one other first notching element, different than the first two, with a given first portion of a first member.

More particularly, in the above-described second configuration, a first notching element 11*a* may bear radially against a second notching element 22*a* upstream of the top of the second notching element 22*a*, another first notching element 18*a* may bear radially against a second notching element 22*f* downstream of the top of the second notching element 22*f*, while yet another first notching element 12*a* may bear against a portion 21*b*. The first notching elements of the spring therefore do not all work simultaneously and in a synchronized manner with the second notching elements in that the first notching elements of the spring are not all disposed in the same way with regard to the second notching elements of the first member 2, in a given configuration of the notching system. This brings about several mechanical actions exerted by the spring, in particular by the first notching elements, on the first member, which have:

- different intensities (mainly determined by the degrees of deformation of the arms), and/or
- different directions (directions determined by angles relative to the radial directions along the axes A1 and A2 at the points of contact of the spring with the first member 2).

Of course, the start of a notch can be defined by more than one first cooperation between a given first notching element and a given second notching element. There may therefore be several first cooperations between given first notching elements and given second notching elements, these first cooperations being simultaneous and synchronized, meaning that they simultaneously produce mechanical actions that are equal or substantially identical in terms of intensities and directions (directions determined by angles relative to the radial directions with respect to the axes A1 and A2 at the points of contact of the spring with the first member 2).

In the embodiment described in FIGS. 1 to 9, in the first configuration of the notching system, the first notching element 15*a* is disposed in angular abutment with respect to the second notching element 22*d* in the same way as the first notching element 11*a* is disposed with respect to the second notching element 22*a*. This is more particularly visible in FIG. 2, which shows the notching system in the abovementioned first configuration.

Thus, the start of the notching is determined more particularly by the simultaneous and synchronized cooperations between the elements 11*a* and 22*a*, and 15*a* and 22*d*, respectively. Furthermore, the end of the notch is determined by the simultaneous and synchronized cooperations between the elements 18*a* and 22*f*, and 14*a* and 22*c*, respectively.

In the embodiment described in FIGS. 1 to 9, the notching system is bidirectional, meaning that it is possible to define a notch in a first direction of rotation of the second member 3, as described above, but that it is also possible to define a notch in a second direction of rotation of the second member 3 by virtue of the same elements or of equivalent elements of the notching system.

A second embodiment of a timepiece 200' is described below with reference to FIGS. 10 to 18.

Preferably, the second embodiment differs from the first embodiment only by the features that are described below.

Thus, the references of elements of the second embodiment are derived from those of elements of the first embodiment (having identical or substantially identical structures and/or identical or substantially identical functions) by the addition of an apostrophe "'".

Mainly, the second embodiment differs from the first embodiment in that the notching system 100' is unidirectional. It thus makes it possible to employ a second "notched" member 3' that is pivoted about the first member 2', specifically in only one direction of rotation.

In the particular variant of the second embodiment that is described below with reference to FIGS. 10 to 18, the notching system generates 120 notches or indexed positions for a complete turn of the second member 3' relative to the first member 2'.

In this particular variant, the first member comprises m second notching elements, where m=15. Thus, the first member 2' in this case comprises 15 second notching elements 22*a*', 22*b*', 22*c*', 22*d*', 22*e*', 22*f*', 22*g*', 22*h*', 22*i*', 22*j*', 22*k*', 221', 22*m*', 22*n*', 220'. In a similar way to the spring 1 according to the first embodiment, the spring 1' in this case comprises eight arms 11', 12', 13', 14', 15', 16', 17', 18', each comprising first notching elements, in particular first notching teeth 11*a*', 12*a*', 13*a*', 14*a*', 15*a*', 16*a*', 17*a*', 18*a*'.

To realize a unidirectional rotation function of the second member 3' relative to the first member 2', the notching system 100' has the particular feature of comprising first angular stop elements and second angular stop means for avoiding any unintentional rotation of the second member 3' relative to the first member 2'.

More particularly:

- each first notching element 11*a*', 12*a*', 13*a*', 14*a*', 15*a*', 16*a*', 17*a*', 18*a*' may comprise a first stop element 111*a*', 121*a*', 131*a*', 141*a*', 151*a*', 161*a*', 171*a*', 181*a*' such as a first flank, a normal direction of which is orthoradial or substantially orthoradial relative to the axis A1, and
- each second notching element 22*a*' to 220' may comprise a second stop element, such as a second flank, a normal direction of which is substantially orthoradial relative to the axis A1.

These first and second stop elements cooperate by obstacle so as to prevent the rotation of the second member 3' relative to the first member 2' in a given direction of rotation.

The first notching elements therefore have the particular feature of being asymmetric. More particularly, there is no straight line passing in a plane P1' of the spring and passing through the axis A1' of the spring with which a first notching element exhibits axial symmetry.

The second notching elements likewise have the particular feature of being asymmetric. More particularly, there is no straight line passing in the plane P2' of the first member and passing through the axis A2' of the first member with which a second notching element 22' exhibits axial symmetry.

Preferably, each elastic arm 11', 12', 13', 14', 15', 16', 17', 18' comprises a first abutment force reacting element 11*b*', 12*b*', 13*b*', 14*b*', 15*b*', 16*b*', 17*b*', 18*b*', the first abutment force reacting element being disposed for example at the midway point of each elastic arm. This abutment force reacting element is provided to cooperate with a stop surface 31*b*', 32*b*', 33*b*', 34*b*', 35*b*', 36*b*', 37*b*', 38*b*' when the first and second stop elements cooperate by obstacle to prevent the rotation of the second member 3' relative to the first member 2' in a given direction of rotation.

Preferably, the first notching elements are provided on a face of the spring 1', in particular an internal face of the spring 1', and the first abutment force reacting elements are provided on another face of the spring 1', in particular an opposite face of the spring 1', in particular an external face of the spring 1'.

Thus, on account of the design of the first notching elements of the spring 1' and of the second notching elements of the first member 2', the notching system 100' is unidirectional. The second member 3' is therefore mounted so as to pivot in only one direction of rotation with respect to the first member 2' and therefore with respect to the case middle 4'. This direction of rotation corresponds to the direction of rotation indicated by the dashed arrows in FIGS. 16 to 18.

In addition, the pivot connections between the spring 1' and the second member 3' are realized in this case by indentations 1*a*' to 1*h*' (acting as first pivot connection elements) provided on the spring 1' in order to cooperate with protuberances 3*a*' to 3*h*' (acting as second pivot connection elements) provided on the second member 3'. Of course, it would be quite possible to replace the indentations with bores, and the protuberances with pins or pegs.

The first and second connection elements make it possible in particular to adequately pretension the spring 1' against the first member 2' while constituting pivot connections of the spring 1' relative to the second member 3', in particular pivot connections connecting two successive elastic arms.

Figure 15:
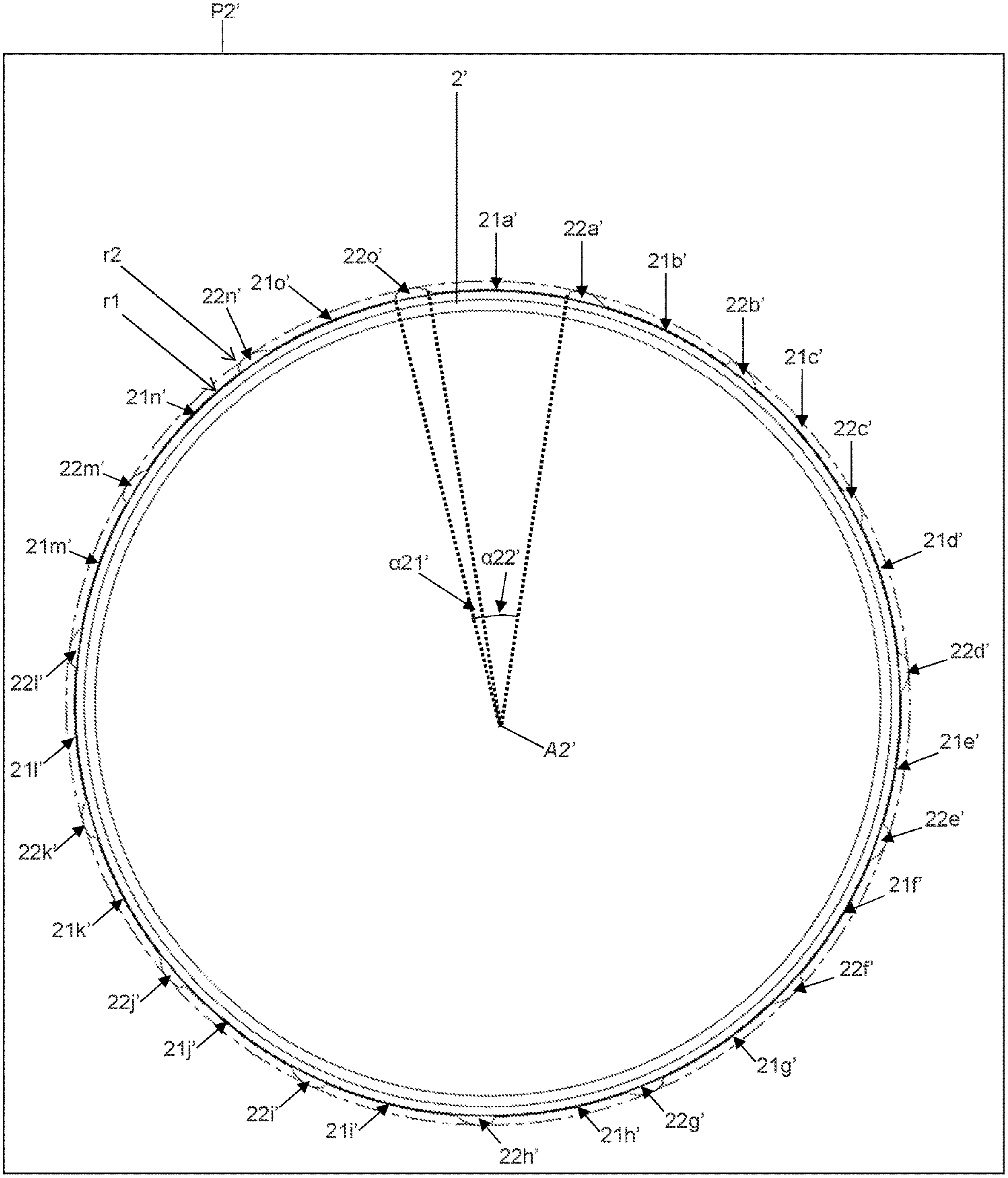
FIG. 15 is a view defining the first member according to the second embodiment.

In the example illustrated in FIGS. 10 to 18, the second member 2' likewise comprises fifteen first annular portions 21*a*' to 210' disposed on a first radius r1 of the first member 2'. The second notching elements 22*a*' to 220' for their part comprise tops disposed on a second radius r2 of the first member 2', as illustrated in FIG. 15. The ratio r2/r1 is involved in particular in the notching sensation. In this particular example, this ratio is around 1.02.

In the example illustrated in FIGS. 10 to 18, the angular extent α21' of a first portion 21', measured from the axis A2' of the first member 2', is in this case around 3 times the angular extent α22' of a second notching element 22', measured from the same axis A2'. The values α21' and α22' make it possible in particular to define the notching frequency.

Figure 16:
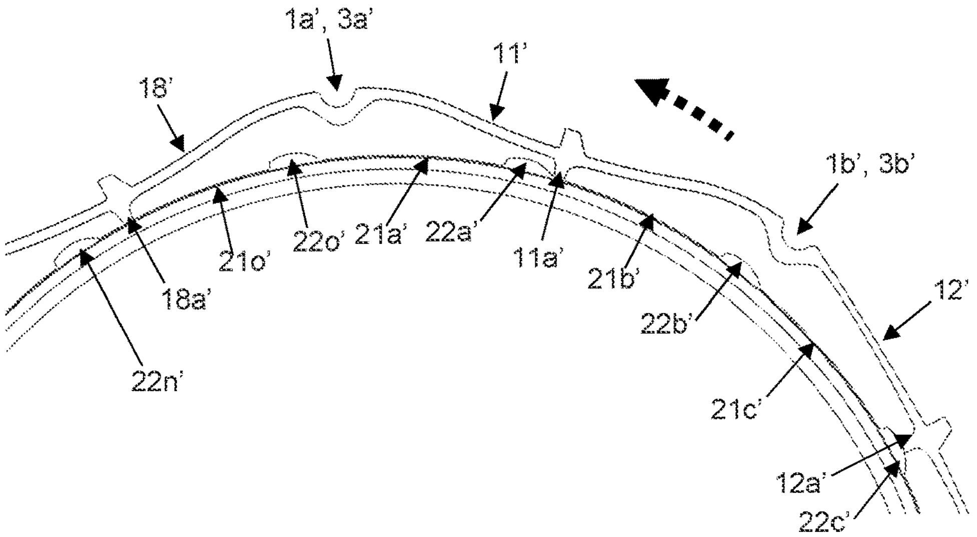
FIGS. 16 to 18 are partial views illustrating an operating sequence of the timepiece according to the second embodiment.
Figure 17:
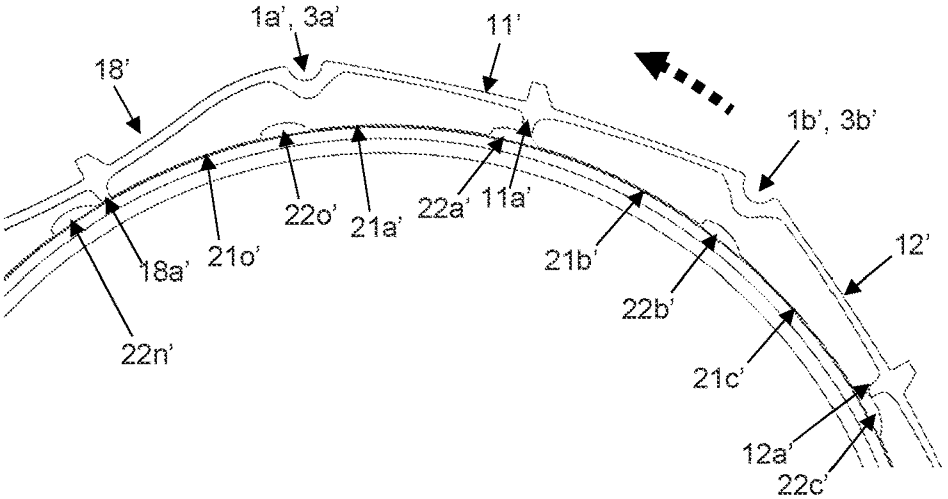
Figure 18:
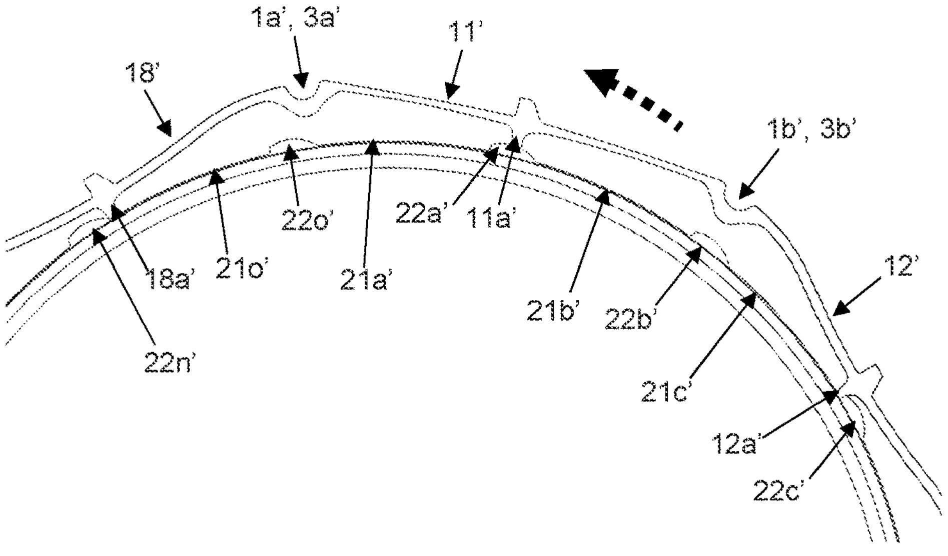

FIGS. 16 to 18 illustrate different configurations of the spring 1' with regard to the first member 2', in order to show the way in which a notching of the device 100' is generated. For the sake of simplification, the second member 3', to which the spring 1' is articulated, is not shown in these figures.

FIG. 16 illustrates a part of the notching system in a first configuration, in which a first notching element 11*a*' of the spring 1' is in angular abutment against a second notching element 22*a*' of the first member 2' in the direction of rotation of the second member 3', indicated by the dashed arrow, while this same first notching element 11*a*' bears radially against a first portion 21*b*' of the first member 2'. This is a first stable angular configuration of the second member 3' with respect to the first member 2'. This first configuration is achieved following pivoting of the second member 3' in its given direction of rotation, and according to a threshold rotational torque of the second member 3'. In this first configuration, the arm 11' has a convex shape as seen from the axis A1' of the spring 1' or the axis A2' of the first member 2'. A first notching element 12*a*' of an arm 12', connected to the arm 11' by a first articulation 1*b*', 3*b*', for its part bears radially against the top of the second notching element 22*c*', i.e. against the second notching element 22*c*' at the radius r2 of the first member 2'. In this first configuration, the arm 12' has a rectilinear or substantially rectilinear shape. Furthermore, a first notching element 18*a*' of an arm 18', connected to the arm 11' by a second articulation 1*a*', 3*a*', for its part bears radially against a first portion 210'. In this first configuration, the arm 18' has a convex shape as seen from the axis A1' of the spring 1' or the axis A2' of the first member 2'.

The crossing of the second notching element 22*a*' by the first notching element 11*a*', i.e. the passage from the radius r1 to the radius r2 of the first member 2', requires an increase in the rotational torque of the second member 3' so as to achieve a rotational torque of the second member 3' that is higher than the threshold torque for driving the second member 3'. To this end, the respective articulations 1*a*', 3*a*' and 1*b*', 3*b*' allow the arm 11' to deform optimally while minimizing the stresses in it. This increase in torque brought about by the cooperation of the elements 11*a*' and 22*a*' characterizes the start of the notch. This increase can be more or less abrupt or linear depending on the geometry of the first notching elements and the second notching elements.

FIG. 17 illustrates a part of the notching system in a second configuration, in which the first notching element 11*a*' bears radially against the second notching element 22*a*', slightly upstream of the top of the second notching element 22*a*', after having partially crossed said second notching element following rotation of the second member 3' in its direction of rotation. In this second configuration, the arm 11' has a rectilinear or substantially rectilinear shape. In this second configuration, the first notching element 18*a*' of the arm 18' remains bearing radially against the first portion 210', and the arm 18' therefore maintains a convex shape as seen from the axis A1' of the spring 1' or the axis A2' of the first member 2'. In this second configuration, the first notching element 12*a*' of the arm 12' remains bearing radially against the second notching element 22*c*', and the arm 12' therefore maintains a rectilinear or substantially rectilinear shape. Nevertheless, in this second configuration, the first notching element 12*a*' has crossed the top of the second notching element 22*c*' and the arm 12' is thus ready to restore the elastic potential energy it has accumulated by virtue of its elastic deformation.

By virtue of the arrangement of the first notching element 12*a*' with respect to the second notching element 22*c*', the second member 3' can thus be driven in rotation in its direction of rotation under the effect of a torque that is below the threshold torque. This decrease in the torque brought about by the cooperation of the elements 12*a*' and 22*c*' characterizes the end of the notch. This decrease can be more or less abrupt or linear depending on the geometry of the first and second notching elements.

FIG. 18 illustrates a part of the notching system after the end of the notch. In this third configuration, the first notching element 12*a*' bears radially against the portion 21*c*' of the first member, after having crossed the second notching element 22*c*', while the first notching element 11*a*' is situated at the top of the second notching element 22*a*'. For its part, the first notching element 18*a*' is in angular abutment against a second notching element 22*n*' of the first member 2', while this same first notching element 18*a*' bears radially against the first portion 210' of the first member 2'.

This third configuration is equivalent to the first configuration in that crossing of the second notching element 22*n*' by the first notching element 18*a*' initiates the start of a second notch, following the above-described first notch. The end of this second notch would then be characterized by the passage of the first notching element 11*a*' from the second notching element 22*a*' to the portion 21*a'*.

This description shows that a given notch is not exclusively defined by a given first notching element cooperating with a given second notching element or by first notching means cooperating simultaneously and in a synchronized manner with different second notching means. In the notching system according to the invention, a notch may be defined by the conjunction:

- of a first cooperation between a given first notching element and a given second notching element, and
- of a second cooperation between another given first notching element and another given second notching element, and possibly
- of a third cooperation between at least one other first notching element, different than the first two, with a given first portion of a first member.

More particularly, in the above-described second embodiment, the first notching element 11*a*' may bear radially against the second notching element 22*a*' upstream of the top of the second notching element 22*a*', the first notching element 12*a*' may bear radially against the second notching element 22*c*' downstream of the top of the second notching element 22*c*', while a third first notching element 18*a*' may bear against a portion 210'.

The first notching elements of the spring therefore do not all work simultaneously and in a synchronized manner with the second notching elements in that the first notching elements of the spring are not all disposed in the same way with regard to a given second notching element of the first member, in a given configuration of the notching system.

Figure 19:
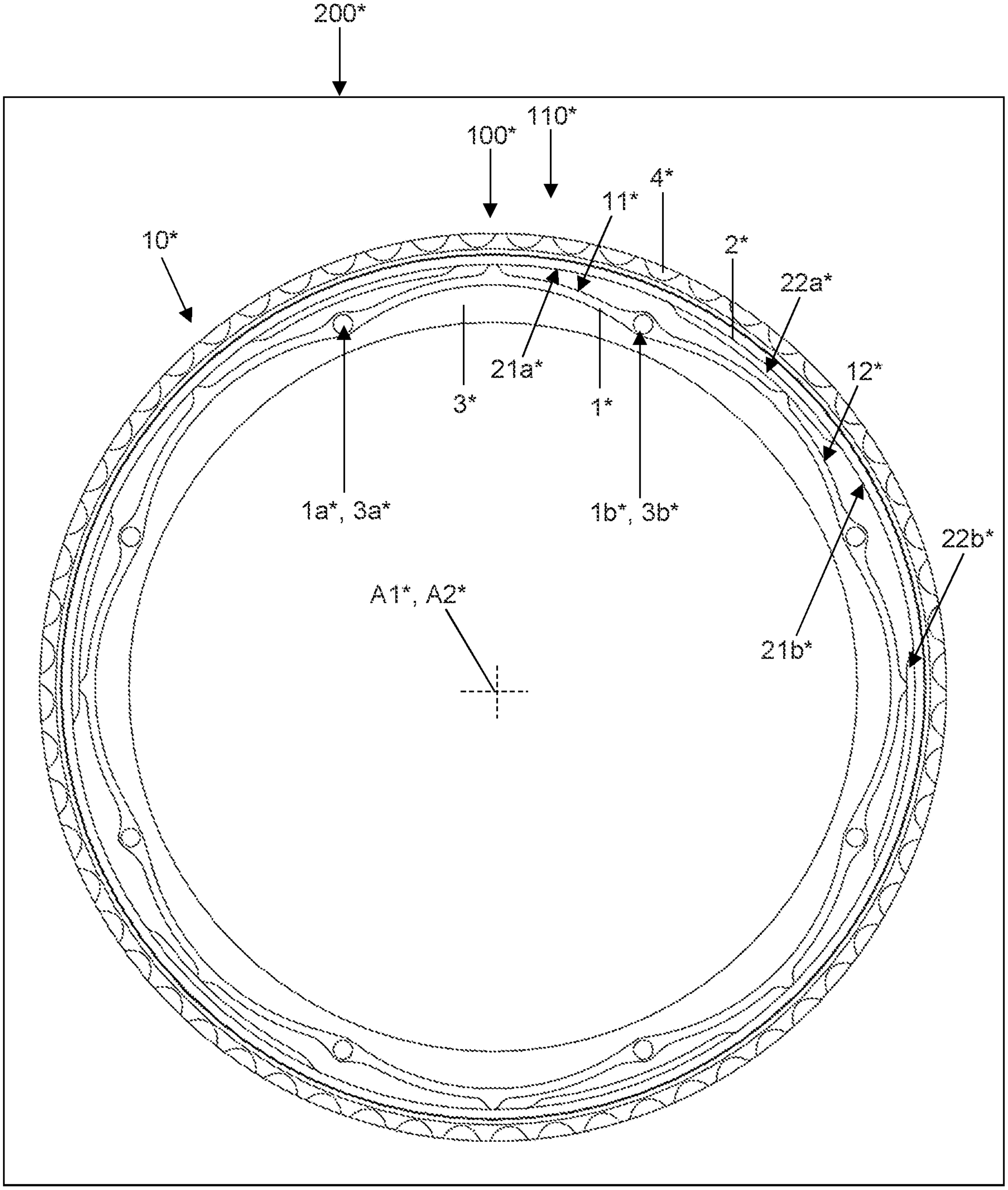
FIG. 19 is a schematic view of a third embodiment of a timepiece.

A third embodiment of a timepiece 200* is described below with reference to FIGS. 19 and 20.

Preferably, the third embodiment differs from the first embodiment only by the features that are described below.

Thus, the references of elements of the third embodiment are derived from those of elements of the first embodiment (having identical or substantially identical structures and/or identical or substantially identical functions) by the addition of an asterisk "*".

As in the example of the first embodiment illustrated in FIGS. 1 to 9, n=8 and m=6. Thus, in this particular variant of the third embodiment, the notching system generates 24 notches or indexed positions for a complete turn of a second member 3* relative to a first member 2*.

Mainly, the third embodiment differs from the first embodiment in that the first member 2* is mounted on the outside of the second member 3* to which a spring 1* is articulated. Consequently, the second notching elements are oriented toward the inside. They form for example an internal toothset. Also consequently, in their unloaded states, the arms 11* of the spring 1* are concave as seen from the axis A1* or A2*. However, preferably, the arms 11*, in their unloaded states, are convex as seen from the tops of the first notching elements.

Figure 20:
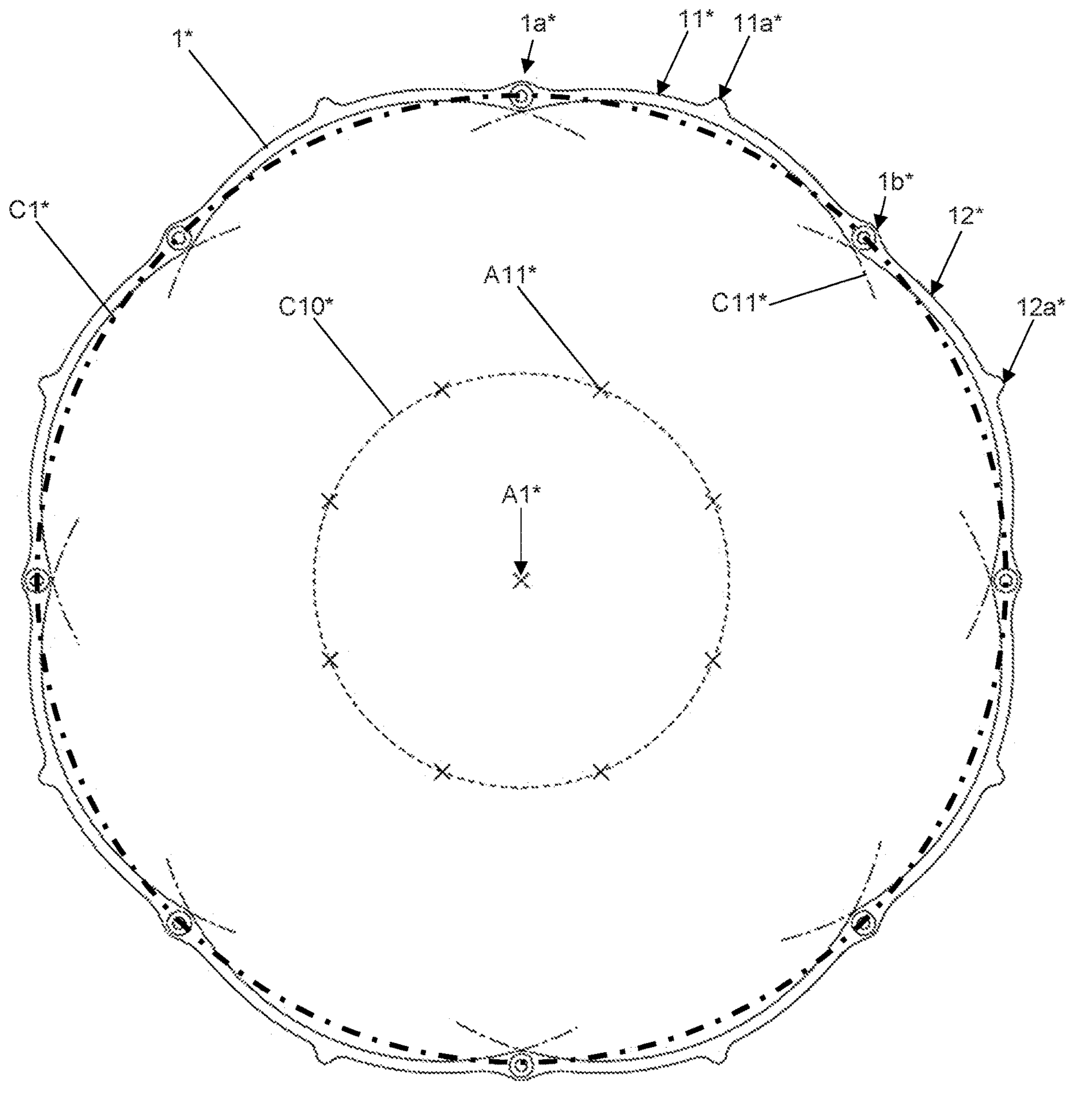
FIG. 20 is a view of a spring according to the third embodiment.

Preferably, as shown in FIG. 20, the elastic arms, in a position in which the spring is not loaded, are in the form of circular arcs C11*, the centers A11* of which are situated preferably on one and the same first circle C10* centered on the axis A1* (i.e. coaxial with the spring) and having a non-zero radius, in particular having a radius greater than 0.2 times the radius of the circle C1* passing through the axes of the first connection elements of the spring 1* (i.e. the radius of the spring), or greater than 0.3 times the radius of the circle C1* (i.e. the radius of the spring), or greater than 0.4 times the radius of the circle C1* (i.e. the radius of the spring). Preferably, the radius is less than 0.9 times or 0.8 times the radius of the circle C1* passing through the axes of the first connection elements of the spring 1* (i.e. the radius of the spring).

Preferably, when an arm 11*, 12* of the spring 1* is deformed elastically by way of the cooperation between a first notching element that it bears and a second notching element 22*a**, 22*b of the first member 2*, the first notching element 11*a, 12*a** does not move inside the circle C1*. This advantageously makes it possible to propose a particularly compact notching system.

Figure 21:
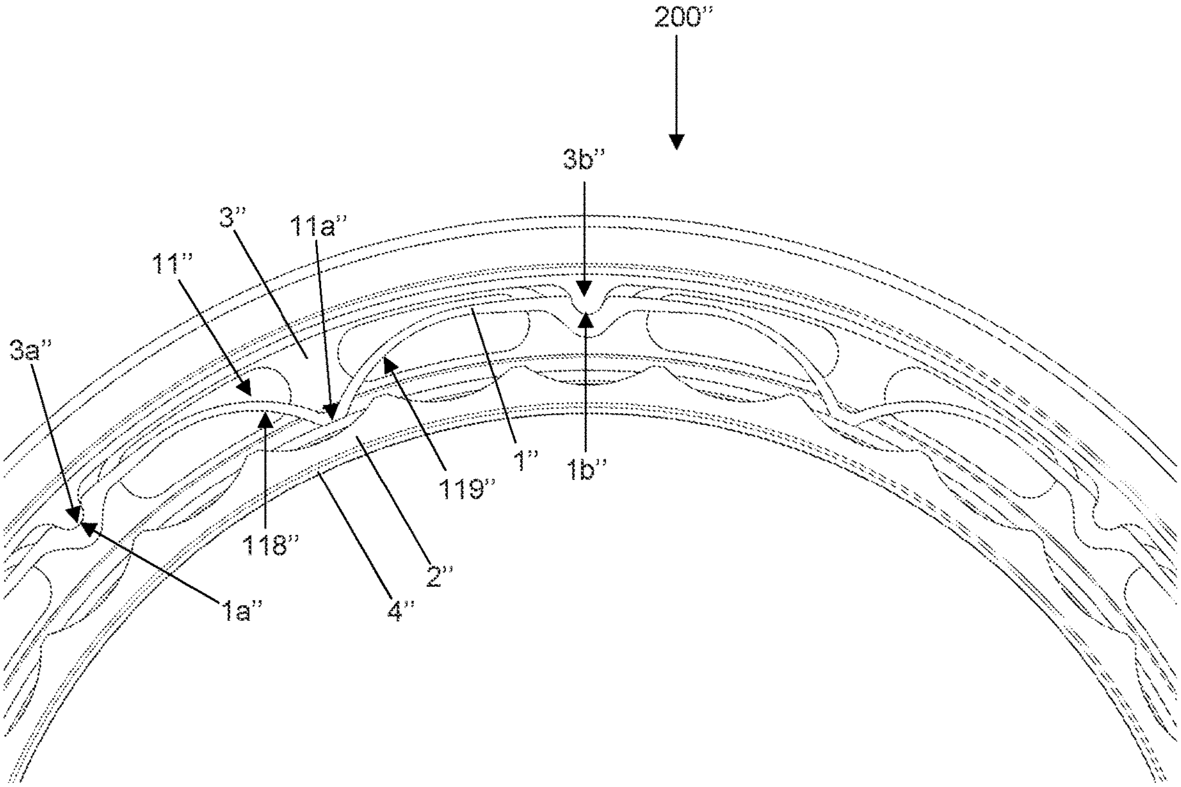
FIG. 21 is a partial view of a fourth embodiment of a timepiece.
Figure 22:
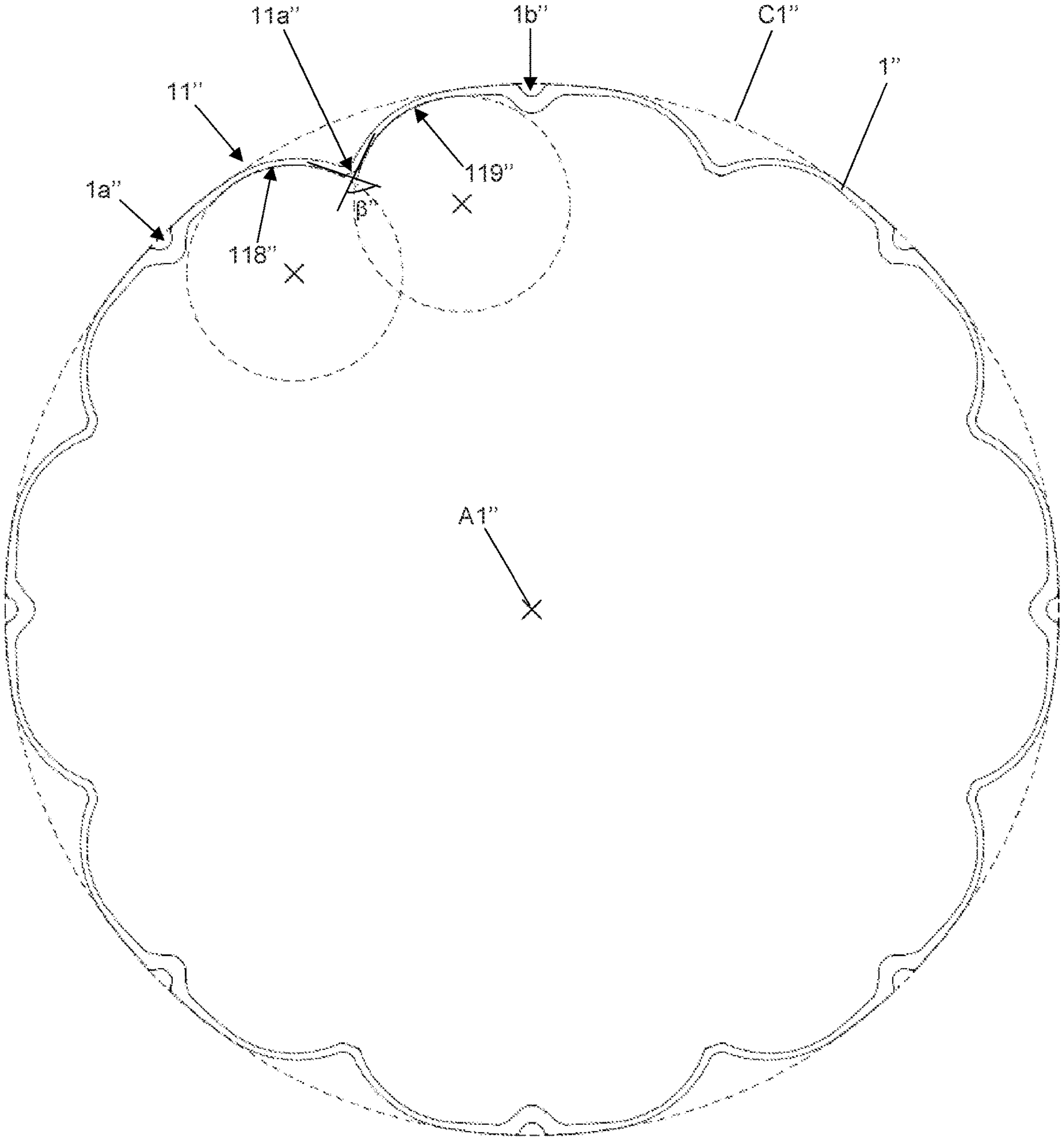
FIG. 22 is a detail view of a spring according to the fourth embodiment.

A fourth embodiment of a timepiece 200" is described below with reference to FIGS. 21 and 22.

Preferably or substantially, the fourth embodiment differs from the first embodiment by the features that are described below:

- the pivot connections 1*b*", 3*b*" connecting mechanically the spring to the second member 3" are carried out as in the second embodiment, and/or
- the shape of the arms 11", and/or
- the shape of the first notching teeth 11*a*".

Thus, the references of elements of the fourth embodiment are derived from those of elements of the first embodiment (having identical or substantially identical structures and/or identical or substantially identical functions) by the addition of the sign "''".

Figure 23:
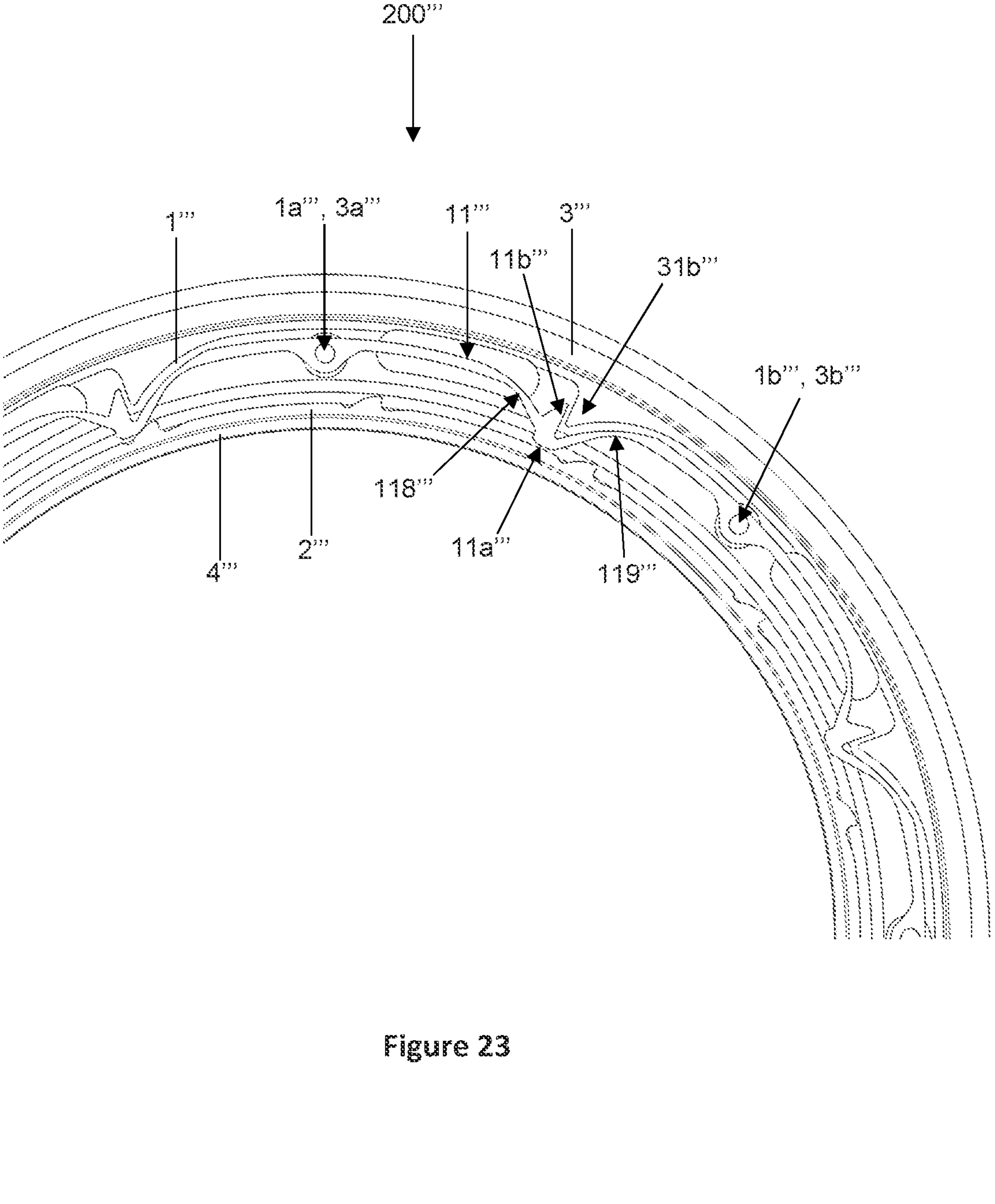
FIG. 23 is a partial view of a fifth embodiment of a timepiece.
Figure 24:
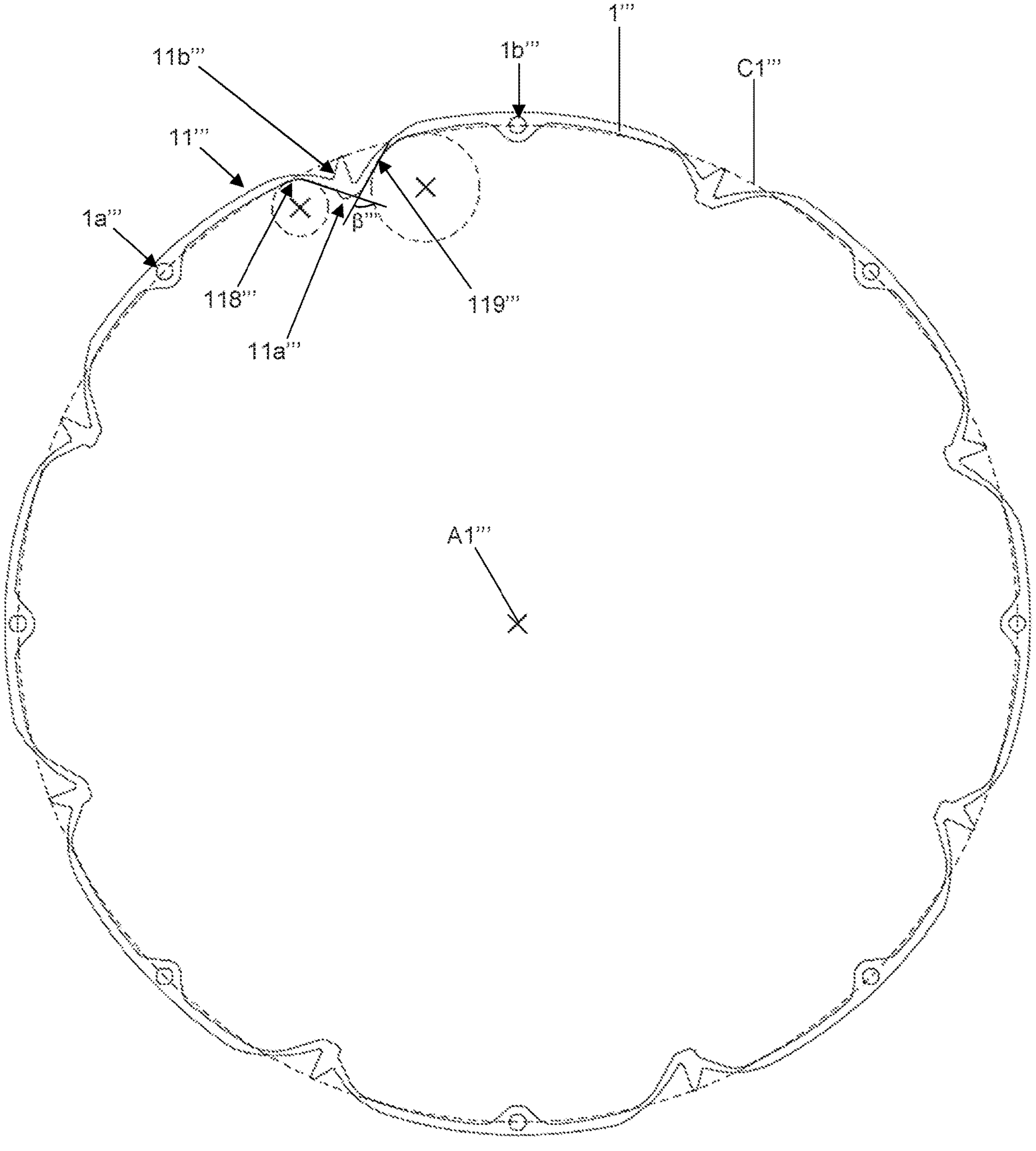
FIG. 24 is a detail view of a spring according to the fifth embodiment.

A fifth embodiment of a timepiece 200'" is described below with reference to FIGS. 23 and 24.

Preferably or substantially, the fifth embodiment differs from the second embodiment by the features that are described below:

- the pivot connections 1*b*'", 3*b*'" connecting mechanically the spring to the second member 3'" are carried out as in the first embodiment, and/or
- the shape of the arms 11'".

Thus, the references of elements of the fifth embodiment are derived from those of elements of the second embodiment (having identical or substantially identical structures and/or identical or substantially identical functions) by replacing "''" with the sign "'''".

In the fourth and fifth embodiments, the arms have preferably a shape comprising two concave parts 118", 119", 118'", 119'" as seen from the top of the first notching tooth. The two concave parts join each other forming an area:

- where the concave parts have tangents forming an angle $\beta''$, $\beta'''$, for example an angle $\beta''$, $\beta'''$ comprised between 60° and 120° or an angle equal to 90° or equal to about 90°, and
- constituting the first tooth.

Preferably, the concave parts:

- have a curvature radius comprised between 0.05 time or 0.1 time the radius of the circle C1", C1'" and 0.3 time the radius of the circle C1", C1'", and/or
- the concave parts are tangent or substantially tangent to the circle C1", C1'" at the ends of the arms.

Irrespective of the embodiment or the variant, the arms of the springs 1, 1', 1*, 1", 1'" may be symmetric or substantially symmetric regarding a radial direction with reference to axis A1, A1', A1*, A1", A1'". Alternatively, the arms of the springs 1, 1', 1*, 1", 1'" may be asymmetric regarding a radial direction with reference to axis A1, A1', A1*, A1", A1'". Thus, the radii of curvature of the concave parts 118", 119"; 118'", 119'" may notably be equal or not.

Irrespective of the embodiment or the variant, the first notching teeth are preferably held by the arms of the spring only, the spring being connected to the first member or to the second member via pivot connections at the end of each arm. Thus, the first notching teeth are preferably mechanically connected to the first member or to the second member via the arms. In particular, the first notching teeth are preferably not directly mechanically connected to the first member or to the second member. Notably, the first notching teeth are not directly mechanically connected to the first member or to the second member via sliding connections, like sliding connection oriented radially or substantially radially to axis A1, A1', A1*, A1", A1'".

Preferably, the only direct mechanical connection existing between:

- a first notching tooth, and
- the first or the second member is a local bearing (point like or line like) on a second notching tooth in configuration where the first and second teeth are cooperating for carrying out the notching.

In the fourth and fifth embodiments, the arms are mainly convex or have a convex middle part. In the fourth and fifth embodiments, the arms are extending integrally or mainly inside a circle that is tangent and extern to the spring at the pivot connections connecting the spring to the second member. In the fourth and fifth embodiments, the parts of the arms 11"; 11'" connecting parts 118", 119"; 118'", 119'" to the pivot connections 1*a*", 1*b*": 1*a*'", 1*b*'" have a curvature radius substantially equal to the radius of a circle crossing the axis of the pivot connections connecting the spring to the second member.

Irrespective of the embodiment or the variant, the spring 1, 1', 1*, 1", 1'" can be made of steel, such as Nivaflex. Alternatively, it can be made of nickel or of a nickel-phosphorus alloy. Alternatively, it can be made of silicon. Also alternatively, it can be made of a metallic glass. Of course, it may alternatively be made of any other material, in particular any other elastic material. The spring may be made, for example, using a mechanical process such as stamping or wire cutting. The spring may also be made by stereolithography, by a LIGA process, by a DRIE etching process, by an injection-molding process or by a laser cutting process.

In the first two embodiments, the notching system involves a spring 1, 1', 1", 1'" mechanically connected, in particular articulated to the second member 3, 3', 3", 3'" which is movable with respect to the first member 2, 2', 2", 2'" the first member being for example a ring 2, 2', 2", 2'" that is part of a case middle 4, 4', 4", 4'" or being fitted in a case middle 4, 4', 4", 4'". However, it is quite possible to reverse the arrangement such that the first member 2* is mounted so as to be movable with respect to the second member 3*. In this case, the first member 2* may correspond, for example, to a rotary bezel portion. In this case, the spring 1* is mechanically connected, in particular articulated to the second member 3*, the second member 3* being for example a ring 3* that is part of a case middle 4* or being fitted in a case middle 4*.

The torque necessary to maneuver the first and second members with respect to one another is variable depending on the natures of the applications, in particular variable depending on the functions ensured by the first member and/or the second member. In the case of an orientable back (i.e. one that is angularly indexed with respect to a case middle), the torque is in particular higher than the torque necessary for rotating a rotary bezel or a rotary flange.

The notching system may also be miniaturized so as to be applied to a crown that is orientable with respect to a case middle (i.e. angularly indexed with respect to a case middle).

The notching system 100, 100', 100*, 100'', 100''' could also be utilized to be applied to a notching mobile of a timepiece movement. In this case, the second member 3, 3', 3'', 3''' or the first member 2* could be a mobile of an adjustment mechanism of a timepiece movement, and the first member 2, 2', 2'', 2''' or the second member 3* could more particularly be a mobile engaged with a display member, typically a display member for a time zone or a programmable display, or vice versa.

Irrespective of the embodiment or the variant, the first and the second notching elements, in particular the first notching teeth and the second notching teeth may be in multiple forms or geometries.

Irrespective of the embodiment or the variant, a notch is not exclusively defined by a given first notching element cooperating with a given second notching element as is the case in the device of the document EP3608730, or by all of the first notching elements cooperating simultaneously and in a synchronized manner with second notching elements as is the case, for example, in the device of the document EP1431845.

Specifically, irrespective of the embodiment or the variant, a notch or an indexed position is defined by the conjunction of at least:

- a first cooperation between a given first notching element and a given second notching element, and
- a second cooperation between another given first notching element and another given second notching element.

Advantageously, this conjunction also comprises a third cooperation between at least one other first notching element, different than the two first ones, with a recess or a portion, in particular a portion of a cylinder, of the first member.

Preferably, irrespective of the embodiment or the variant, the notching system is designed so as to generate notches that are distributed uniformly over a complete turn of the first member relative to the second member or vice versa, meaning that the movement of the first member relative to the second member is the same between each notch. Also preferably, the notch is predefined and remains the same irrespective of the angular position of the first or the second member, meaning that the threshold torque allowing the notch to be crossed remains the same irrespective of the notch in question. Alternatively, the notching system could be designed such that notches could be associated with threshold torques of different intensities. Furthermore, the notching frequency could vary over a complete turn of the first member relative to the second member or vice versa, meaning that the movement of the first member relative to the second member can vary between two successive notches. Such a system could then comprise a first member comprising second notching elements having geometries that are not all identical and/or a spring comprising first notching elements having geometries that are not all identical. Furthermore, the angular extent all and/or the angular extent $\alpha\mathbf{12}$ may vary. The angular extent $\alpha\mathbf{21}$ and/or the angular extent $\alpha\mathbf{22}$ may also vary.

Throughout this document, "indexing", "angular indexing" or "indexing of a member" is understood to define different stable angular positions of a first member relative to a second member or vice versa. These stable positions may be separated by a continuum of unstable or less stable intermediate positions. Between two stable positions or two indexed positions or two indexing positions, the first member passes temporarily through a continuum of unstable or less stable intermediate positions. The first or the second member can leave a stable position only if a torque higher than a threshold torque is exerted on the first or the second member, whereas the first or the second member can leave an unstable or less stable position when a torque lower than this threshold torque is exerted on the first or the second member.

Throughout this document, an "arm" is understood preferably to mean any elongate shape in which the greatest dimension of the shape along a greatest-dimension axis is at least more than 10 times or more than 15 times each of the dimensions perpendicular to this greatest-dimension axis. Alternatively or in addition, throughout this document, an "arm" is understood preferably to mean any elongate shape that is involved at least partially in defining the contour of a spring. Thus, a succession of arms define substantially the contour of the spring, in particular a closed loop.

Throughout this document, a "position in which an arm of the spring is not loaded" is understood preferably to mean that the first notching element of the arm does not cooperate with a second notching element or the first notching element of the arm is positioned in a recess between two adjacent second notching elements, in particular against a portion of a cylinder of the second member.

Throughout this document, a "notching system" is understood preferably to mean a system defining a finished set of notches or indexed positions disposed over the path of the movement of the first member relative to the second member (or vice versa). The notches may be characterized with respect to a threshold torque that it is necessary to overcome in order to move the first member relative to the second member (or vice versa). The start of a notch may be characterized by an increase in the torque with respect to this threshold torque. The end of a notch may be characterized by a decrease in the torque with respect to this threshold torque. The change in the torque to be overcome may be more or less abrupt relative to the movement of the first member with respect to the second member (or vice versa). Starting from this threshold torque, the torque required to drive the first member relative to the second member (or vice versa) may change in various ways as far as the next notch or as far as the next indexed position. In particular, the torque may decrease down to negative values in order then to be canceled out and define the next notch or the next indexed position. Preferably, the number of notches is a multiple of 2.

Throughout this document, a "notch" is understood to mean a movement between a first indexed position and a following indexed position.

The notching systems described above employ a return spring having the specific feature of being provided with elastic arms and with first connection means of said spring, the latter being arranged and designed so as to maximize the deformation of the elastic arms while minimizing the stresses in them. More particularly, these first connection means are disposed at each of the longitudinal ends of the elastic arms and make it possible to connect all of said elastic arms while allowing them to be movable relative to one another. Furthermore, each of these elastic arms has the specific feature of comprising a first notching element provided between two first connection means, this first notching element being provided to cooperate with second notching means of a notching ring in order to bring about the elastic deformation of said arm.

On account of its simplicity and compactness, such a notching system could advantageously be utilized in the definition of a timepiece exterior device, in particular a notched rotary bezel, or in the definition of a notching mobile of a timepiece movement.

The above-described notching systems make it possible to overcome the drawbacks known from the prior art. In particular, the above-described notching systems comprise first and second notching means, the size or the format of which is maximized with respect to the number of notches generated by said device, these first and second notching means being able to be loaded at a lower frequency than the frequency of the notches generated by the notching system.

Furthermore, the above-described notching systems have the advantage of generating balanced forces with respect to a given axis of rotation, this contributing to the pleasant sensation felt when manipulating a timepiece device comprising such a notching system.

Lastly, the above-described notching systems have the advantage of being particularly compact. Such designs are thus particularly advantageous for the definition, for example, of a rotary bezel arranged within a case provided with a case middle comprising an annular seat, the section of which is minimized, and/or for the definition, for example, of a set rotary bezel.

On account of their compactness, the above-described notching systems are also particularly well suited to being integrated into a timepiece movement. These systems may be, for example, devices for adjusting a device for displaying time information such as a time zone, which make it possible to move a display member through an angular pitch predefined by way of such a notching system.

The invention claimed is:

1. A notching system comprising:

a spring including a first toothset comprising n first teeth, a first member including a second toothset comprising m second teeth, and a second member mounted so as to be movable with respect to the first member, the first and second toothsets being arranged so that, through their interactions, they define p notches or indexed positions, the spring comprising:

at least two elastic arms, and at least one first pivot connection element between the two elastic arms, the second member comprising at least one second pivot connection element cooperating with the at least one first pivot connection element so as to create at least one fixed axis pivot connection between the spring and the second member, so that deformations of the at least two elastic arms maintain angular and radial positions of the at least one fixed axis pivot connection relative to the second member when the second member is rotated, wherein the elastic arms, when they are not loaded, are in the form of circular arcs. centers of which are situated on one and a same first circle coaxial with the spring and having a non-zero radius. wherein the first circle has a radius greater than 1.5 times the radius of the spring.

2. The notching system as claimed in claim 1, wherein p=m×n/k, where k is a natural integer.

3. The notching system as claimed in claim 2, wherein:

p=24 and n=8 and m=6, or p=30 and n=6 and m=5, or p=60 and n=10 and m=12, or p=60 and n=12 and m=15, or p=60 and n=12 and m=20, or p=120 and n=8 and m=15.

4. The notching system as claimed in claim 1, wherein the first teeth of the spring are situated between two fixed axis pivot connections.

5. The notching system as claimed in claim 4, wherein the first teeth of the spring are situated at the midway point of each of the elastic arms.

6. The notching system as claimed in claim 1, wherein the spring is designed so that, when one of the arms of the spring is not loaded, the arm is convex as seen from a top of the first tooth of the arm.

7. The notching system as claimed in claim 1, wherein at least one of the following:

the spring is in the form of a closed loop, the system comprises n elastic arms and/or n fixed axis pivot connections, where n≥2.

8. The notching system as claimed in claim 1, wherein at least one of the following:

the spring has substantially a polygonal shape, segments linking the axes of the first pivot connection elements constitute a polygonal shape.

9. The notching system as claimed in claim 1, wherein each of the first teeth comprises a first stop element.

10. The notching system as claimed in claim 1, wherein each of the elastic arms comprises a first abutment force reacting element.

11. The notching system as claimed in claim 1, wherein at least one of the following:

the first member is a ring, the second teeth are each separated by a recess or a portion.

12. The notching system as claimed in claim 1, wherein the first and second toothsets are arranged so that, at a given time, a first tooth exerts a first mechanical action on a second tooth in a first area of contact and a first tooth different than the previous one exerts a second mechanical action on a second tooth different than the previous one in a second area of contact, the first and second mechanical actions having different intensities, different directions, or both different intensities and different directions.

13. The notching system as claimed in claim 12, wherein, at a given time, another first tooth exerts a third mechanical action on a portion or a recess of the second member.

14. The notching system as claimed in claim 12, wherein the first and second toothsets are arranged so that an indexed position of the first member relative to the second member is defined by the first mechanical action and by the second mechanical action, the first and second mechanical actions bringing about opposing torques for driving the first member relative to the second member.

15. A timepiece device, wherein the timepiece device is:

a rotary bezel, or a rotary flange, or an orientable back, or an orientable crown, or a display device for a time zone or a display device for a programmable display, and wherein the timepiece device comprises a notching system as claimed in claim 1.

16. A timepiece case comprising a notching system as claimed in claim 1.

17. A timepiece comprising a case as claimed in claim 16.

18. A notching system as claimed in claim 1, wherein the second member is mounted so as to be rotatable with respect to the first member.

19. The notching system as claimed in claim 1, wherein there are a plurality of fixed axis pivot connections between the spring and the second member, axes of the pivot connections being located on a same circle.

20. The notching system as claimed in claim 1, wherein the at least one fixed axis pivot connection is in the form of a pin, peg, or protrusion on the second member penetrating into a circular bore on the spring.

21. A notching system comprising:

a spring including a first toothset comprising n first teeth, a first member including a second toothset comprising m second teeth, and a second member mounted so as to be movable with respect to the first member, the first and second toothsets being arranged so that, through their interactions, they define p notches or indexed positions, the spring comprising:

at least two elastic arms, and at least one first pivot connection element between the two elastic arms, the second member comprising at least one second pivot connection element cooperating with the at least one first pivot connection element in order to create at least one pivot connection between the spring and the second member, p1 wherein the first and second toothsets are arranged so that, at a given time, a first tooth exerts a first mechanical action on a second tooth in a first area of contact and a first tooth different than the previous one exerts a second mechanical action on a second tooth different than the previous one in a second area of contact, the first and second mechanical actions having different intensities, different directions, or both different intensities and different directions.

22. The notching system as claimed in claim 21, wherein, at a given time, another first tooth exerts a third mechanical action on a portion or a recess of the second member.

23. The notching system as claimed in claim 21, wherein the first and second toothsets are arranged so that an indexed position of the first member relative to the second member is defined by the first mechanical action and by the second mechanical action, the first and second mechanical actions bringing about opposing torques for driving the first member relative to the second member.

24. A notching system comprising:

a spring including a first toothset comprising n first teeth, a first member including a second toothset comprising m second teeth, and a second member mounted so as to be movable with respect to the first member, the first and second toothsets being arranged so that, through their interactions, they define p notches or indexed positions, the spring comprising:

at least two elastic arms, and at least one first pivot connection element between the two elastic arms, the second member comprising at least one second pivot connection element cooperating with the at least one first pivot connection element in order to create at least one pivot connection between the spring and the second member, wherein p=m×n/k, where k is a natural integer, wherein:

p=24 and n=8 and m=6, or p=30 and n=6 and m=5, or p=60 and n=10 and m=12, or p=60 and n=12 and m=15, or p=60 and n=12 and m=20, or p=120 and n=8 and m=15.

25. A notching system comprising:

a spring including a first toothset comprising n first teeth, a first member including a second toothset comprising m second teeth, and a second member mounted so as to be movable with respect to the first member, the first and second toothsets being arranged so that, through their interactions, they define p notches or indexed positions, the spring comprising:

at least two elastic arms, and at least one first pivot connection element between the two elastic arms, the second member comprising at least one second pivot connection element cooperating with the at least one first pivot connection element in order to create at least one pivot connection between the spring and the second member, wherein the first teeth of the spring are situated between two pivot connections, p1 wherein the first teeth of the spring are situated at the midway point of each of the elastic arms.

* * * * *